(12) United States Patent
Nishigaya et al.

(10) Patent No.: US 7,092,984 B2
(45) Date of Patent: Aug. 15, 2006

(54) METHOD AND APPARATUS FOR DETERMINING DYNAMIC FLOW AND COMPUTER-READABLE MEDIUM STORING A PROGRAM FOR PERFORMING THE METHOD

(75) Inventors: Takashi Nishigaya, Kawasaki (JP); Shigeki Fukuta, Setagaya (JP)

(73) Assignee: Fujitsu Limited, Kawasaki (JP)

( * ) Notice: Subject to any disclaimer, the term of this patent is extended or adjusted under 35 U.S.C. 154(b) by 721 days.

(21) Appl. No.: 09/750,785

(22) Filed: Jan. 2, 2001

(65) Prior Publication Data

US 2001/0010056 A1 Jul. 26, 2001

(30) Foreign Application Priority Data

Jan. 25, 2000 (JP) .............................. 2000-015386

(51) Int. Cl.
*G06F 15/16* (2006.01)
*G06F 9/46* (2006.01)

(52) U.S. Cl. ....................... 709/201; 709/246; 718/106
(58) Field of Classification Search ................ 718/102, 718/106; 709/223, 229, 201, 202
See application file for complete search history.

(56) References Cited

U.S. PATENT DOCUMENTS 5,627,764 A 5/1997 Schutzman
6,038,558 A * 3/2000 Powers et al. .............. 718/106
6,421,667 B1 * 7/2002 Codd et al. ................. 718/106

FOREIGN PATENT DOCUMENTS

JP 10320205 A 4/1998

OTHER PUBLICATIONS

Search Report for corresponding European Application No. 00128730.9 dated Mar. 15, 2005.
Geppert, Andreas, et al., "Event-based Distributed Workflow Execution with EVE", Technical Report 96.05, XP002194570; Mar. 1, 1996, pp. 1-16.
Ben-Shaul, Israel, et al., "WebRule: an Event-based Framework for Active Collaboration Among Web Servers", Computer Networks and ISDN Systems, vol. 29, No. 8-13, XP004095301; Sep. 1997, pp. 1029-1039.

* cited by examiner

*Primary Examiner*—Paul H. Kang
(74) *Attorney, Agent, or Firm*—Staas & Halsey LLP

(57) ABSTRACT

A dynamic flow determination apparatus dynamically determines a flow by means of an action chain in event processing performed in a distributed system. Having generality and independence of actions, event processing is executed or changed flexibly.

Parts executed in event processing are separated as actions, and definitions of event processing are defined from action parts, which are changeable. When a received message is an event object, action execution unit 14 ignites a flow control unit 20. The flow control unit 20 selects actions to be ignited from the actions stored in an agent in accordance with a type of the received event object, whereby, repeated selections, the action chain is realized.

21 Claims, 18 Drawing Sheets

(A)                    AGENT (B)

(A)

(B)

(A)

(B)

METHOD AND APPARATUS FOR DETERMINING DYNAMIC FLOW AND COMPUTER-READABLE MEDIUM STORING A PROGRAM FOR PERFORMING THE METHOD

CROSS REFERENCE TO RELATED APPLICATION

The contents of Japanese Patent Application No. 31622/1999, filed on November, 1999 in Japan, is incorporated herein by reference.

BACKGROUND OF THE INVENTION

1. Field of the Invention

The present invention relates to event processing in a distributed system in which a plurality of computers connected via a network operate in a coordinated manner, and more particularly to a method and apparatus for determining dynamic flow by means of an action chain which enables flexible chaining of actions. The present invention is applicable to distributed-object-oriented platforms such as CORBA, DCOM, and Java RMI.

2. Description of the Related Art

An event processing model plays an important role in the development of a distributed processing system. When an interface between objects linked to one another is designed by use of an event processing model which is based on a proper rule, local behaviors can be grasped even if the distributed processing system becomes large in scale and complex.

A general event processing model used in conventional distributed systems will be described. An object which sends an event is called an "event source," and an object which receives the event and performs some processing is called an "event listener."

FIG. 15 shows an example of a class definition used in a conventional event processing model; and FIG. 16 shows an example sequence of conventional event processing. An object (Source object) serving as an event source has an interface (addEventListener( ) in this example) through which at least event listeners are registered from the outside. An object (Listener object) serving as an event listener has an action method (action( ) in this example) which is executed upon generation of an event.

First, the reference pointer of the event listener is registered in the event source (Source object) by means of the interface (addEventListener()). In response to a state change (status changed), the event source calls a predetermined action method by use of the registered reference pointer of the event listener. In this manner, processing linked to the generation of an event can be performed on the distributed system.

This model has a drawback in that since processing which is executed upon generation of an event is defined as a method of the event listener, the behavior of the event listener cannot be changed during execution of the event processing system. Another drawback is that whether each object is to behave as an event source or to behave as an event listener is determined at the time of designing the object, and its role cannot be changed during execution of event processing.

SUMMARY OF THE INVENTION

A first object of the present invention is to enable the behavior of an event listener to be changed, even when a distributed processing system is running.

A second object of the present invention is to enable the role of an object of each computer (i.e., whether the object is to serve as an event source or as an event listener) to be changed, even when the object is performing the role, in a distributed processing system.

A third object of the present invention is to enable processing executed upon generation of an event to be expressed easily in the form of a chain of a plurality of actions, in a distributed processing system.

A fourth object of the present invention is to enable determination of a dynamic flow, without deteriorating the versatility and independence of each event, in a distributed processing system.

A fifth object of the present invention is to enable determine of a dynamic flow, without increasing the load imposed on a CPU and memory, in a distributed processing system.

The present invention provides a dynamic flow determination apparatus for dynamically determining a flow by means of an action chain in event processing performed in a distributed system. The dynamic flow determination apparatus comprises an action/attribute storage unit for storing actions to be executed upon receipt of an event object, separately from an object server; and a flow control unit for selecting an action to be ignited from the actions stored in the action/attribute storage unit in accordance with a type of the received event object, whereby the action chain is realized.

The present invention further provides a dynamic flow determination apparatus which comprises: an action/attribute storage unit for storing definition information regarding each of actions; a message reception unit for receiving a message; a message transmission unit for transmitting a message; an action management unit for changing definition information regarding an action when the received message is a request for changing the definition information regarding the action; a pattern match processing unit for comparing the contents of a parameter of a message which is received as an action execution request with the information stored in the action/attribute storage unit in order to select matched actions; an action execution unit for managing execution of the selected action; and a flow control unit which is started by the action execution unit upon receipt of an event object in order to select an action to be executed next in accordance with a type of the received event object and to execute the selected action.

The present invention further provides a method for dynamically determining a flow by means of an action chain in event processing performed in a distributed system. In the method, actions which are executed upon receipt of an event object is separated from a server object; and flow control means is provided in the server object in order to select actions to be ignited in accordance with the type of the received event object. Selection and execution of an action to be ignited next is controlled by the flow control means, so that it becomes possible to dynamically introduce new event processing without affecting other actions in the server object.

The present invention further provides a medium storing a program for causing a computer to operate as an apparatus for dynamically determining a flow by means of an action chain in event processing performed in a distributed system. The program causes the computer to perform: message reception processing for receiving a message; message transmission processing for transmitting a message; action management processing for changing definition information regarding an action when the received message is a request for changing the definition information regarding the action; pattern match processing for comparing the contents of a parameter of a message which is received as an action execution request with a pattern for selection of actions in order to select matched actions; action execution processing for managing execution of the selected action; and flow control processing which is started upon receipt of an event object in order to select an action to be executed next in accordance with a type of the received event object and to execute the selected action.

The present invention provides a dynamic flow determination apparatus which comprises action/attribute storage means for storing actions to be executed upon receipt of an event object, separately from an object server; and flow control means for selecting actions to be ignited from the actions stored in the action/attribute storage means in accordance with a type of the received event object, whereby the action chain is realized.

The present invention further provides a dynamic flow determination apparatus which comprises: action/attribute storage means for storing definition information regarding each of actions; message reception means for receiving a message; message transmission means for transmitting a message; action management means for changing definition information regarding an action when the received message is a request for changing the definition information regarding the action; pattern match processing means for comparing the contents of a parameter of a message which is received as an action execution request with the information stored in the action/attribute storage means in order to select matched actions; action execution means for managing execution of the selected action; and flow control means which is started by the action execution means upon receipt of an event object in order to select actions to be executed next in accordance with a type of the received event object and to execute the selected actions.

These, together with other objects and advantages which will be subsequently apparent, reside in the details of construction and operation as more fully described and claimed hereinafter, with reference to the accompanying drawings, wherein like numerals refer to like parts throughout.

DESCRIPTION OF THE PREFERRED EMBODIMENTS

First Embodiment

Figure 17:
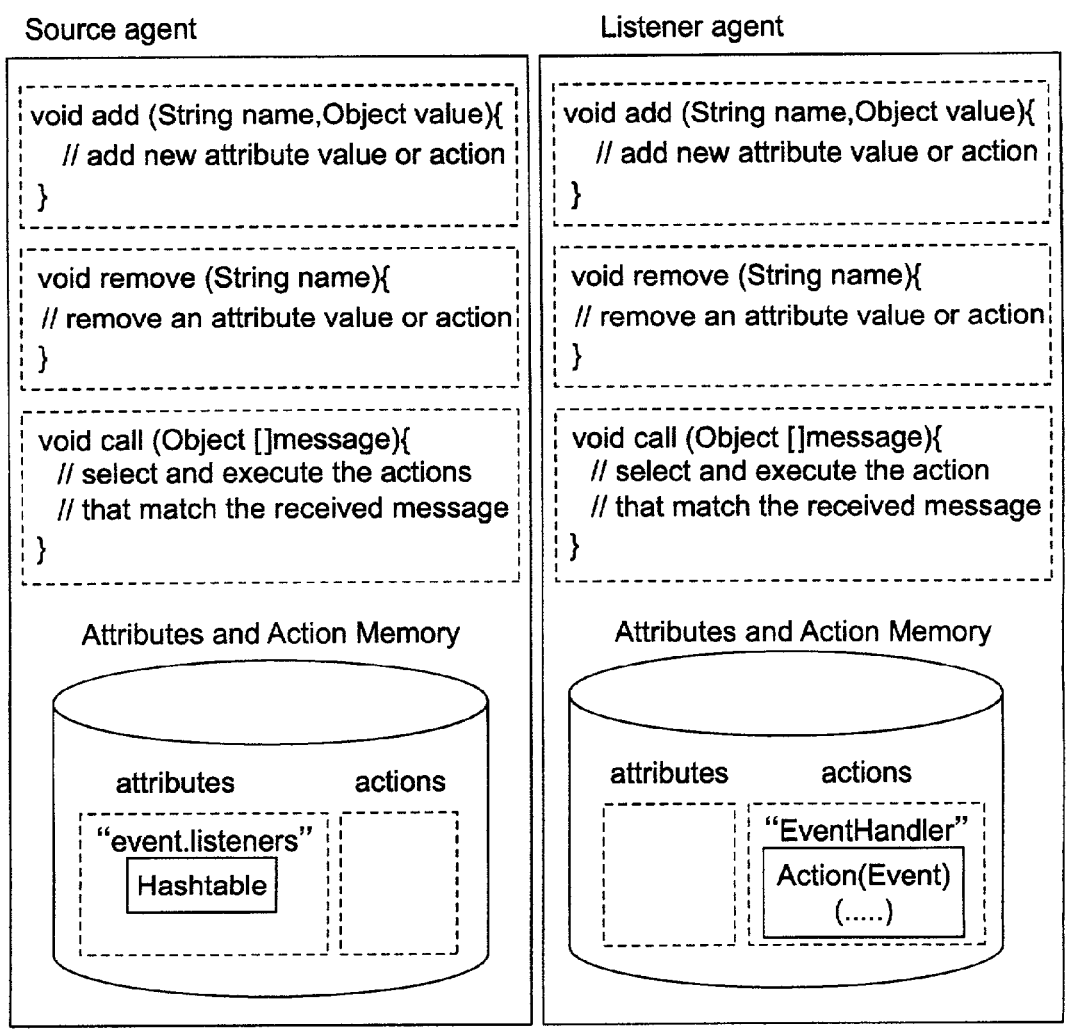
FIG. 17 is a diagram showing an example of a class definition used in an action-separated-type event processing model.
Figure 18:
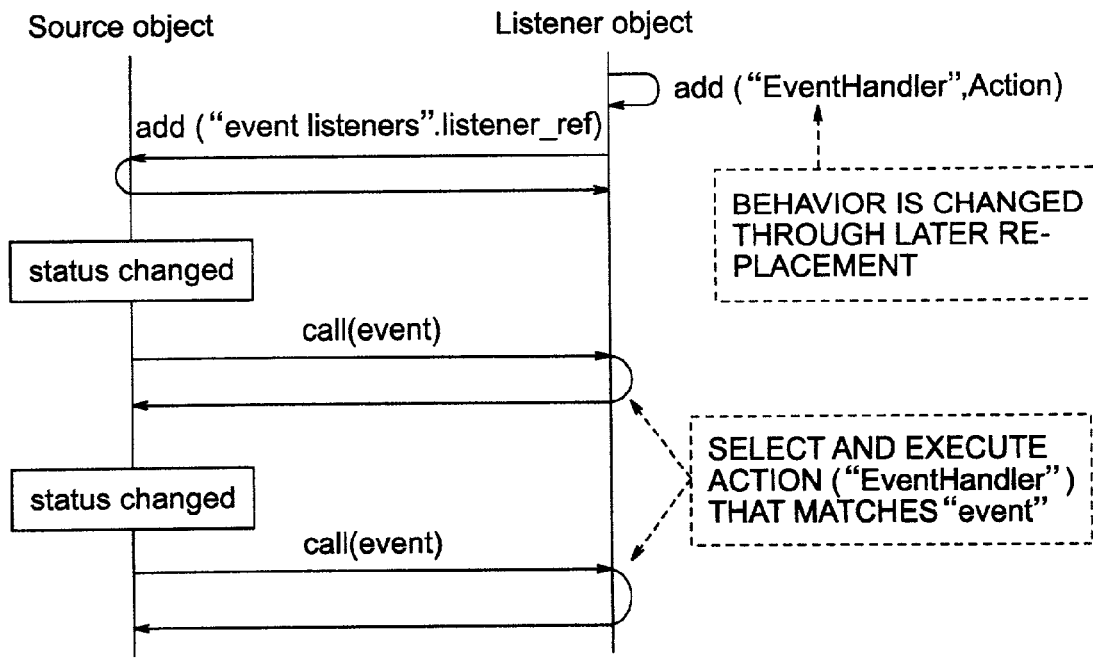
FIG. 18 is a diagram showing an example sequence of action-separated-type event processing.

In order to solve the problems involved in the conventional event processing model, the inventors of the present invention have conceived an agent action model (an action-separated-type event processing model). FIG. 17 shows an example of a class definition used in an action-separated-type event processing model; and FIG. 18 shows an example sequence of action-separated-type event processing.

This model is designed such that an event listener and an action, which is a definition of operation, are separated from each other on the object level, and behavior at the time of generation of an event can be changed during execution of event processing. An event source and an event listener are realized by use of a source agent (Source agent) and a listener agent (Listener agent), respectively, which are general models.

In the above-described conventional event processing model, an event source performs event processing through calling a method of a predetermined event listener. By contrast, in the agent action model, a source agent does not call a specific method but transmits an event only as a message to an agent (listener agent) serving as an event listener. The listener agent selects and executes an action which matches the received message. Therefore, behavior at the time of reception of an event can be changed through replacement of the old action with a new action which has the same input pattern but different contents. Further, since an object serving as an event source and an object serving as an event listener are derived from the same agent, the role of each object can be determined dynamically through a combination of actions rather than through objects level.

Figure 19:
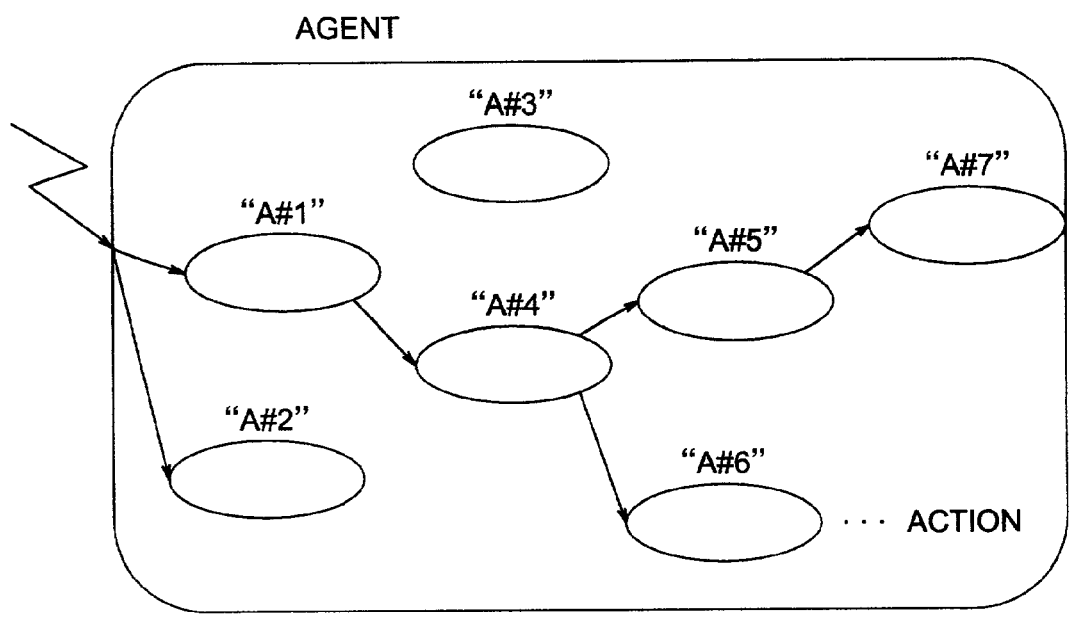
FIG. 19 is a diagram showing an example of flow produced as a result of action chaining.
Figure 20:
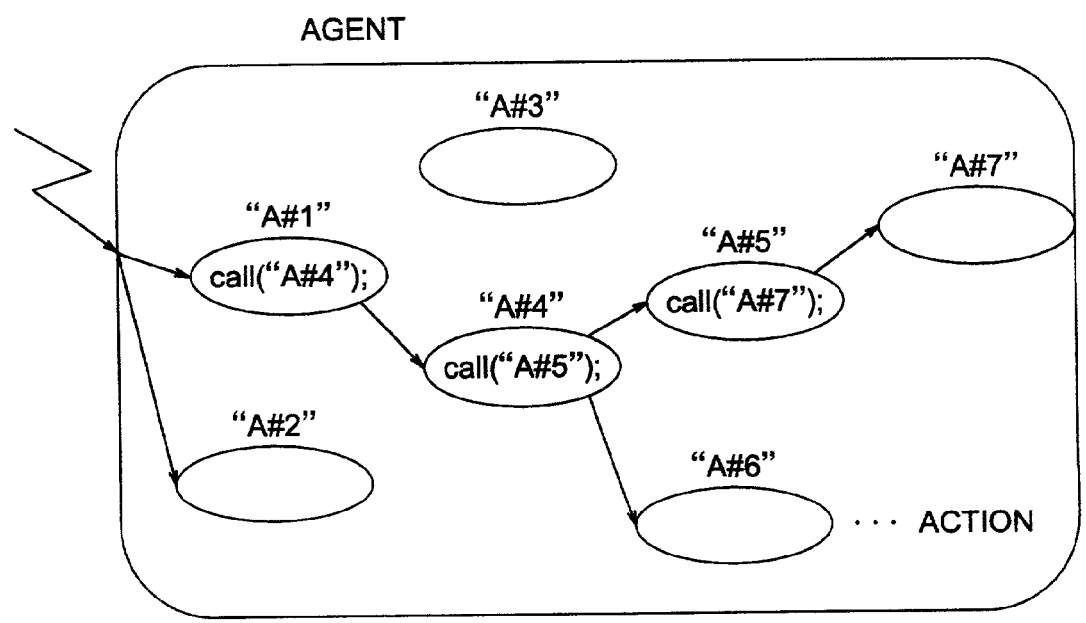
FIG. 20 is a diagram shown an example method of generating an action chain.

Although the above-described embodiment (agent action model) can determine action dynamically, processing executed upon generation of an event is difficult to express in the form of a chain of a plurality of actions, as shown in FIG. 19. As shown in FIG. 20, such a flow caused by a chain of actions can be realized through addition of a description (call ("A#4");) for calling the next action "A#4" within an action "A#1", for example. However, since a code which is effective only in a specific status is embedded in each action, the versatility and independence of each action are compromised.

Further, since call of an action is performed in a synchronized manner as in the case of RPC (Remote Procedure Call) and method call, when chained n actions are executed, n threads are generated. Therefore, the load acting on a CPU and memory increases as the chain of actions becomes long.

Second Embodiment

In order to solve the above-described problems, the present inventors improved the above-described embodiment. In the improved embodiment, processing which is executed synchronously with generation of an event is realized by means of a flow model represented by use of a chain of actions in an agent action model; and there is provided flow control means which selects an action to ignite in accordance with the type of a received event object to thereby manage the flow.

In accordance with the type and status of the event, the flow control means repeats selection and execution of actions present in an action/attribute storage area in order to generate a chain of actions, thereby determining a dynamic flow.

The flow control means can be implemented within the action/attribute storage area, in the form of a special action.

The second embodiment of the present invention operates as follows. When a message received from another agent is an action execution request, the message is transferred to action execution means. The action execution means checks whether an action which has a name designated by a parameter of the execution request of the received message is present in the action/attribute storage area. When such an action is present, the action execution means executes the action and awaits completion of the processing. After completion of the execution of the action, the action execution means sends the execution result to the requester agent.

When the parameter of the execution request designates an event object, the action execution means starts the flow control means.

The flow control means creates a message pattern on the basis of the event object, which is a parameter of the execution request; transmits to message transmission means an action execution request in which its own address is set as a transmission-destination address; and waits for an execution result. The execution result is sent back via the action execution means. Similar processing is repeated in subsequent steps.

That is, the flow control means creates a message pattern on the basis of the event object, and issues an action execution request. If the execution result which has been sent back contains a list of action names, the flow control means duplicates an event object in order to execute the listed actions in parallel. Subsequently, the flow control means recursively issues an execution request which includes each action name as a parameter. If the execution result which has been sent back contains no data, the flow control means ends processing in order to stop the chained execution of the actions.

As described above, in the present invention, independence of actions which constitute a flow is secured; and combined use of action components designed for general purpose enables easy definition of an event processing procedure and easy customization of an event processing procedure which has already been created.

When a chain of actions is determined, the system checks whether an input pattern indicating the type of an event object that an action can handle matches the type of an event object actually generated, whereby the system can determine a proper flow to some degree. This mitigates the burden imposed on a designer of the flow and prevents the designer to define an erroneous flow. Further, since definition of an action and definition of its input pattern are separated, even when the contents of an action which is applicable over a wide range is applied to a flow of a specific event type, the contents of the action are not required to change; instead, the event type of the input pattern of the action is narrowly defined.

Further, if necessary, the input pattern of an action can be defined to include not only the type of an event, but also an attribute value of a received event object, and the name and type of an action which has just been executed. Thus, it becomes possible to control the order of actions in the flow.

Next, a concrete embodiment of the present invention will be described.

Figure 1:
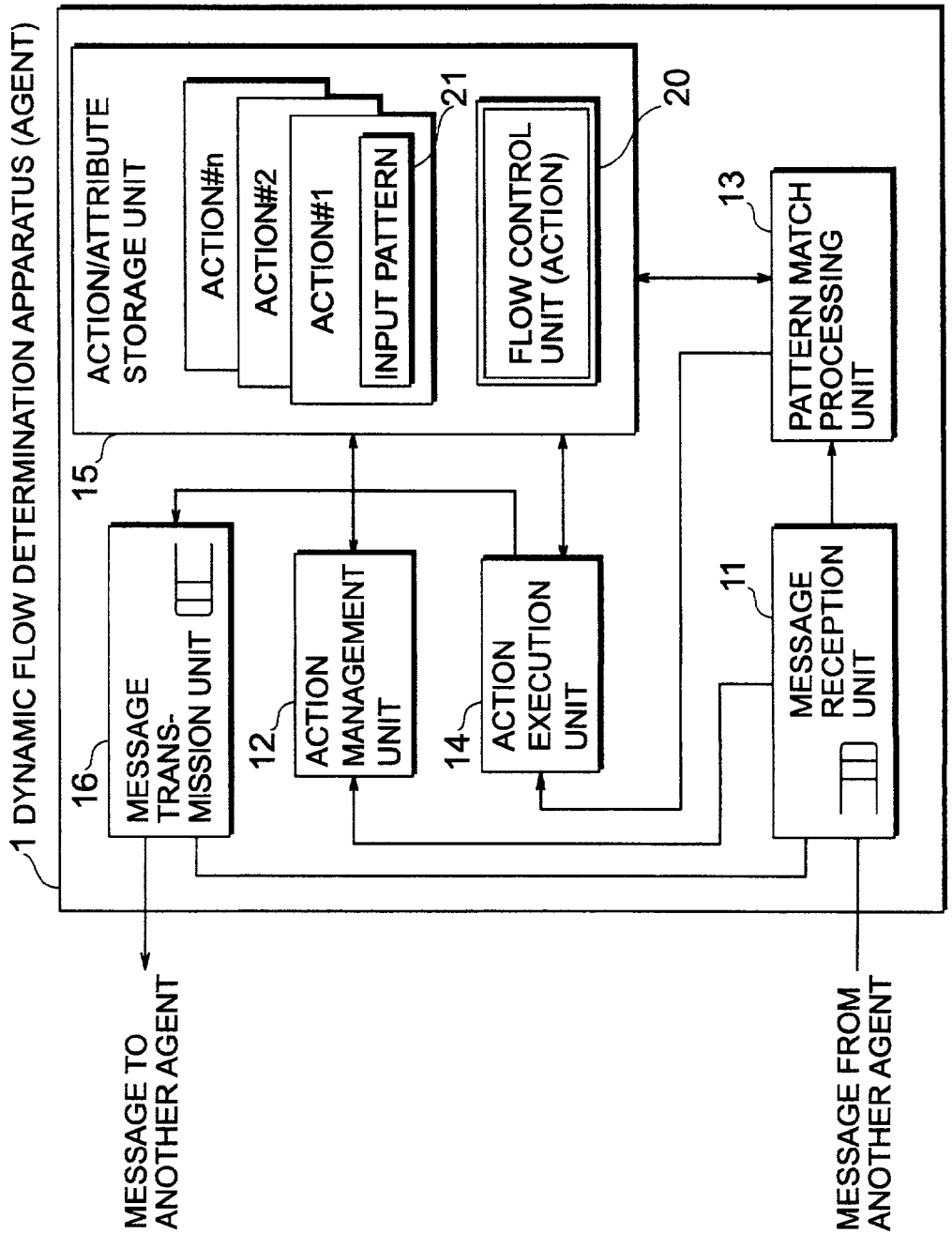
FIG. 1 is a diagram showing the configuration of a system according to the invention.

FIG. 1 is a diagram showing the configuration of a system according to the invention. A dynamic flow determination apparatus (agent) 1 according to the present invention comprises a message reception unit 11, an action management unit 12, a pattern match processing unit 13, an action execution unit 14, an action/attribute storage unit 15, and a message transmission unit 16. The action/attribute storage unit 15 includes not only a plurality of actions (actions #1 to #n) but also a flow control unit 20, which is a feature of the present invention.

The message reception unit 11 has a queue for temporarily accumulating messages transmitted from other agents, and distributes the messages to different processing units (modules) in accordance with the types of the messages. The action management unit 12 accepts a request for changing the configurations of actions provided in the agent, and changes the configurations of actions in accordance with the request. The pattern match processing unit 13 compares the contents of the parameter of a message which has been received as an action execution request with the input pattern of each of actions stored in the agent and selects a matched action. The action execution unit 14 manages execution of the actions stored in the action/attribute storage unit 15. The action/attribute storage unit 15 is an area for storing the codes of the respective actions and the flow control unit (action) 20. The message transmission unit 16 receives a message in relation to action management, an execution request, etc., and transmits the message, execution request, etc. to a corresponding agent.

The flow control unit 20 is realized as one action. When the flow control unit 20 receives from the action execution unit 14 an event object, which is a parameter of an execution request, the flow control unit 20 creates an action execution request in which the own address is set as a transmission-destination address, and transmits the request to the message transmission unit 16. Subsequently, the flow control unit 20 awaits an execution result, and upon receipt of a new event object as the execution result, the flow control unit 20 creates and transmits an execution request again. The flow control unit 20 repeats the above-described processing to thereby control the flow. In other words, when the received message is an event object, the flow control unit 20 is started in order to repeat selection and execution of action components present within the agent in accordance with the type and status of the event. Thus, the flow control unit 20 generates a chain of actions, thereby determining a dynamic flow.

Figure 2:
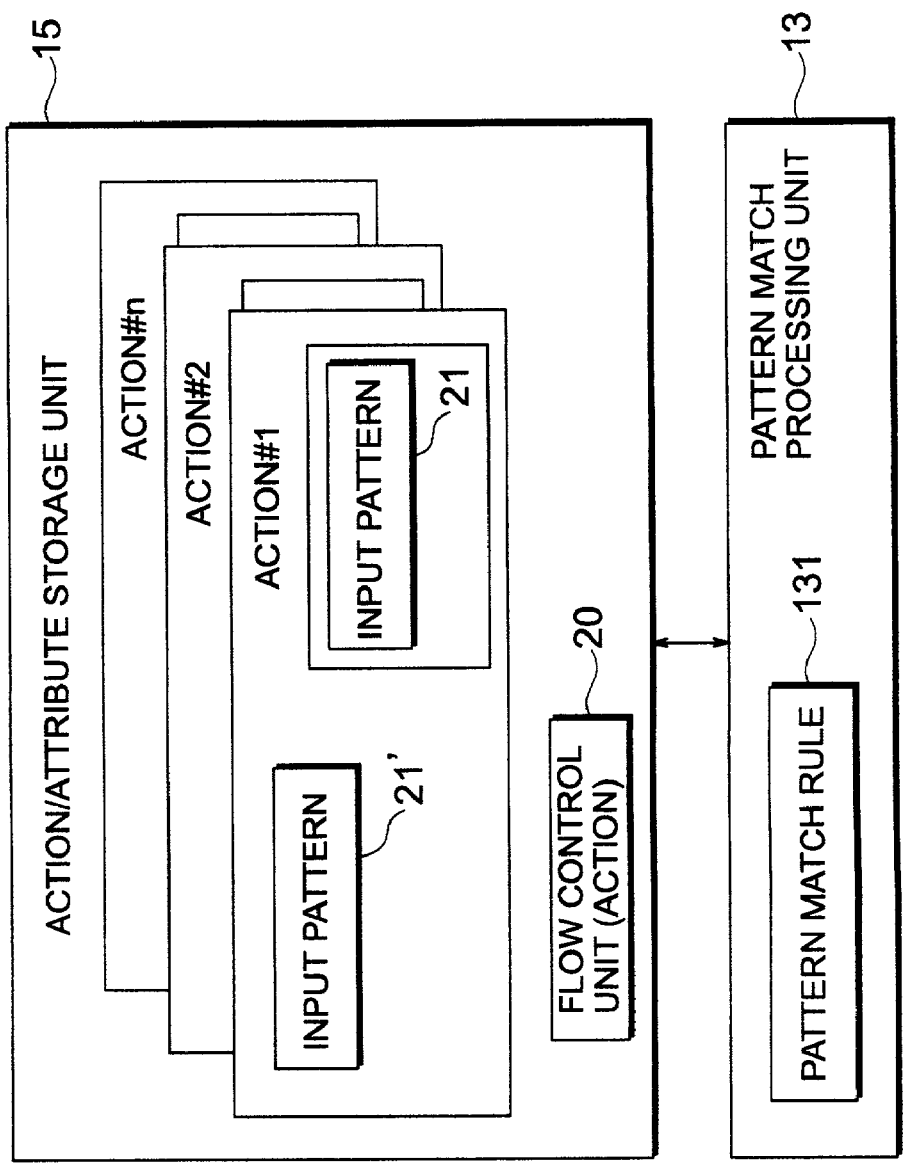
FIG. 2 is a diagram showing a first example configuration of an action/attribute storage unit.

It is to be noted that, as shown in FIG. 2, in addition to the actions (#1 to #n), a changeable input pattern 21' may be provided in each of action storage areas of the action/attribute storage unit 15. This configuration is effective when the contents of each action is a compiled program, because the input pattern can be changed without replacement of the action itself.

Figure 3:
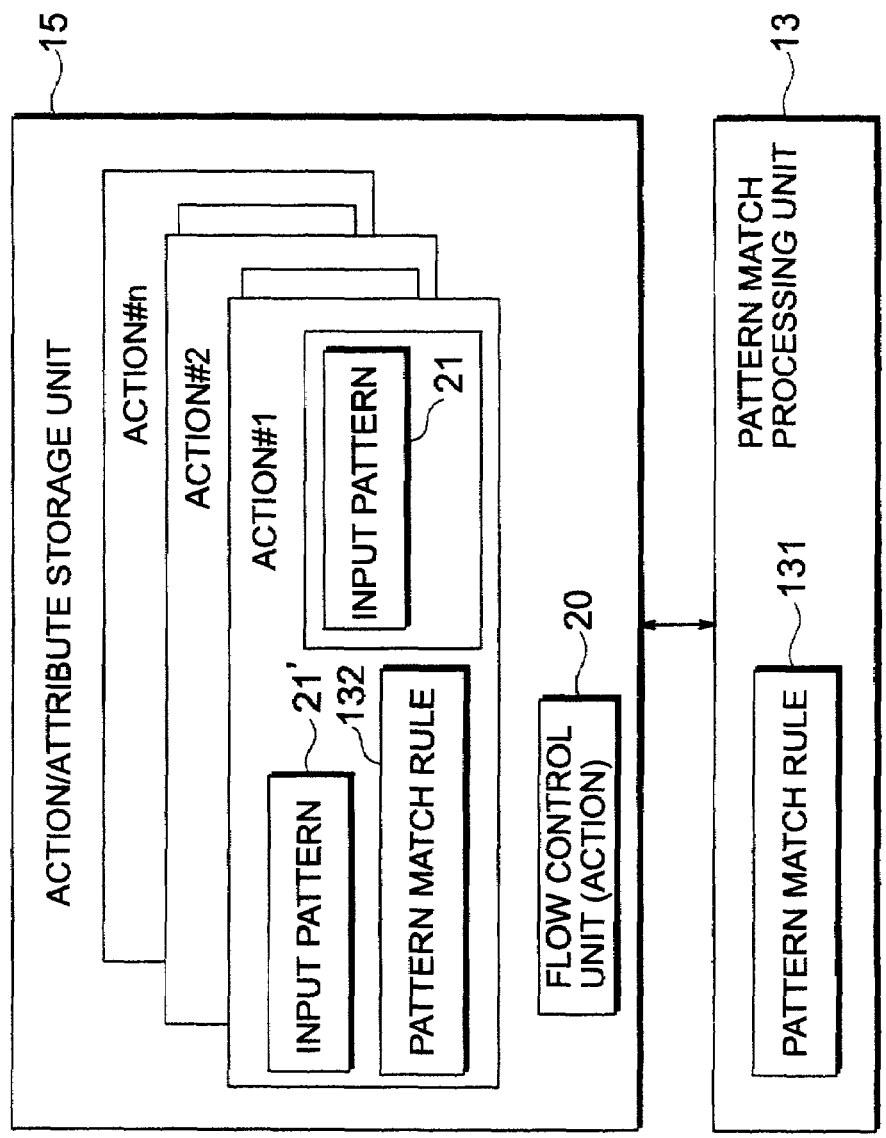
FIG. 3 is a diagram showing a second example configuration of the action/attribute storage unit.

Further, as shown in FIG. 3, an area for storing a pattern match rule 132 for each action may be provided in the action/attribute storage unit 15. In this case, the pattern match processing unit 13 refers to the pattern match rule 132 held for each action to thereby check the degree of matching of the input pattern. This enables the pattern match rule to be expanded easily, as in the case of replacement of actions.

Figure 4:
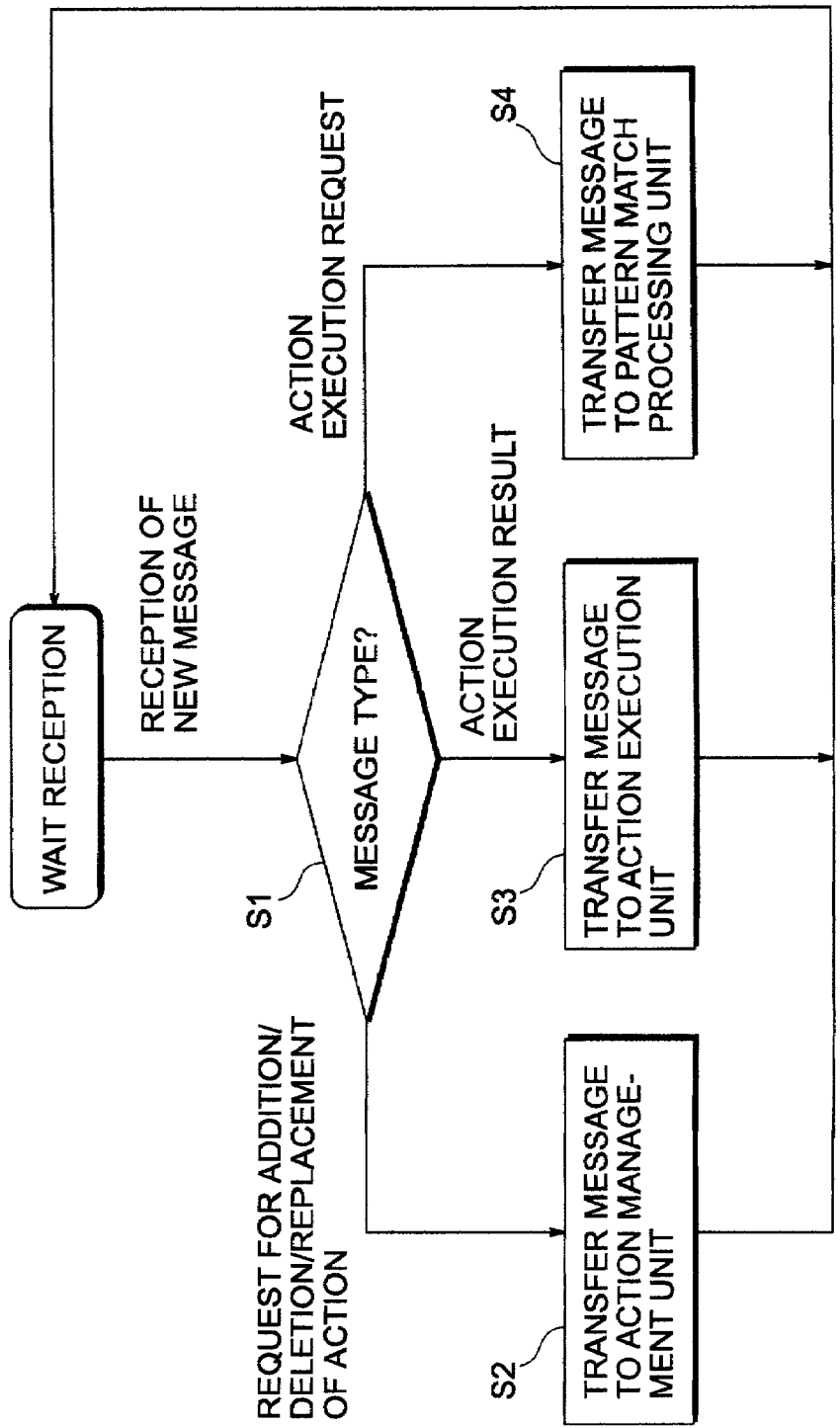
FIG. 4 is a flowchart showing processing performed in a message reception unit.

Next, the processing performed in each unit will be described. FIG. 4 is a flowchart showing processing performed in the message reception unit 11. The message reception unit 11 judges the type of a message (step S1). When the received message is a request for addition, deletion, or replacement of an action, the message reception unit 11 transmits the message to the action management unit 12 (step S2). When the received message is an action execution result, the message reception unit 11 transmits the message to the action execution unit 14 (step S3). When the received message is an action execution request, the message reception unit 11 transmits the message to the pattern match processing unit 13 (step S4).

Figure 5:
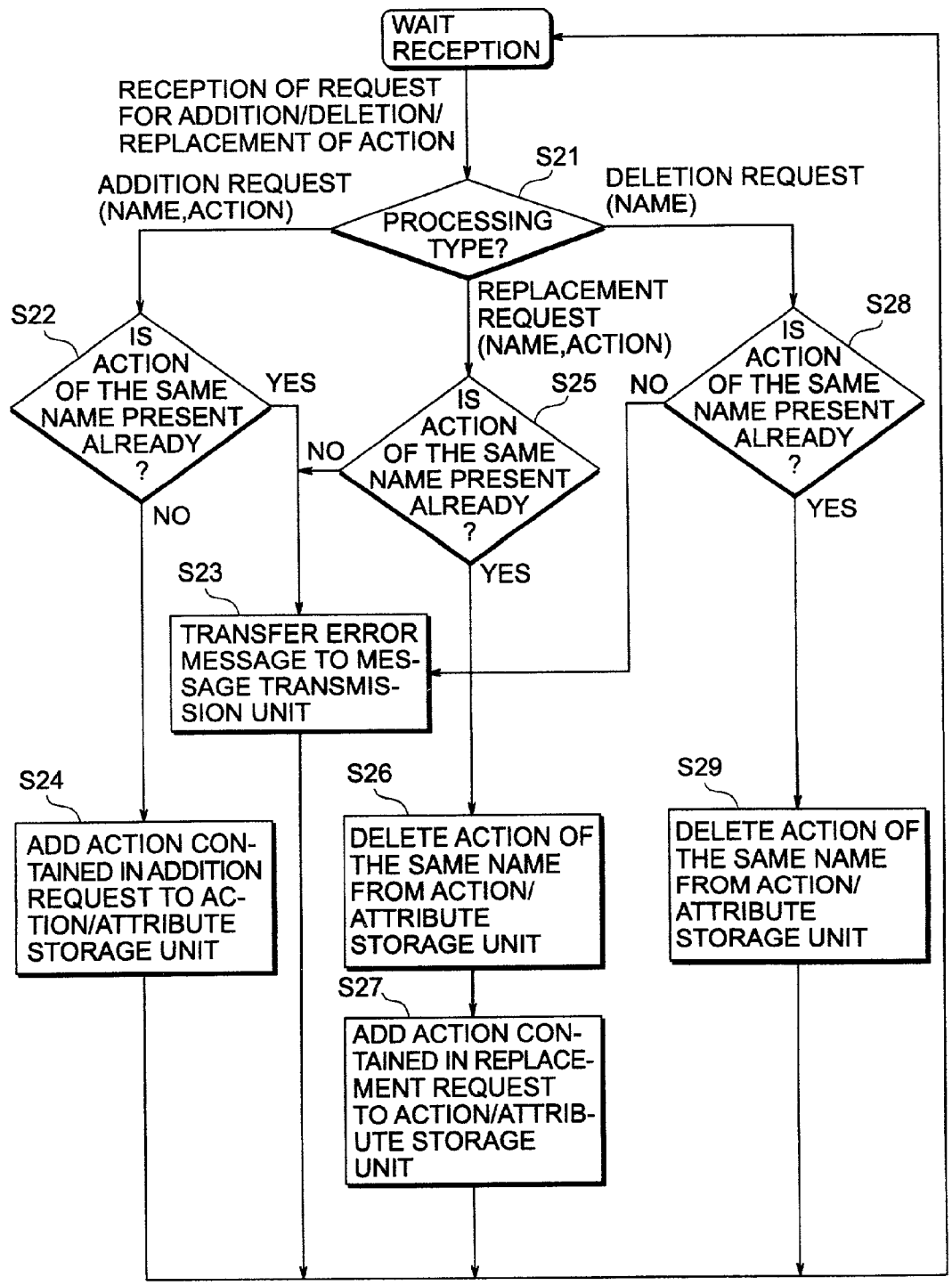
FIG. 5 is a flowchart showing processing performed in an action management unit.

FIG. 5 is a flowchart showing processing performed in the action management unit 12. Upon receipt of a message, the action management unit 12 judges the type of processing designated by the received message (step S21). When the action management unit 12 receives an action addition request (parameter: name, action), the action management unit 12 checks whether an action whose name is the same as the name (action name) designated by the parameter of the addition request is present in an action storing area (step S22). If an action having the same name is present, the action management unit 12 transmits an error message to the message transmission unit 16 in order to send the error message back to a requestor agent (step S23). If an action having the same name is not present, the action management unit 12 adds and stores an action, which is contained in the addition request as a parameter, in the action/attribute storage unit 15, along with a designated name (step 24).

When the action management unit 12 receives an action replacement request (parameter: name, action), the action management unit 12 checks whether an action whose name is the same as the name (action name) designated by the parameter of the replacement request is present in the action storing area (step S25). If an action having the same name is not present, the action management unit 12 sends an error message back to the requester agent (step S23). If an action having the same name is present, the action management unit 12 removes the action having the same name from the action/attribute storage unit 15 (step S26), and adds and stores an action, which is contained in the replacement request as a parameter, in the action/attribute storage unit 15, as an action of the same name (step S27).

When the action management unit 12 receives an action deletion request (parameter: name), the action management unit 12 checks whether an action whose name is the same as the name (action name) designated by the parameter of the deletion request is present in the action/attribute storage unit 15 (step S28). If an action having the same name is not present, the action management unit 12 sends an error message back to the requester agent (step S23) If an action having the same name is present, the action management unit 12 removes the action having the same name from the action/attribute storage unit 15 (step S29).

Figure 6:
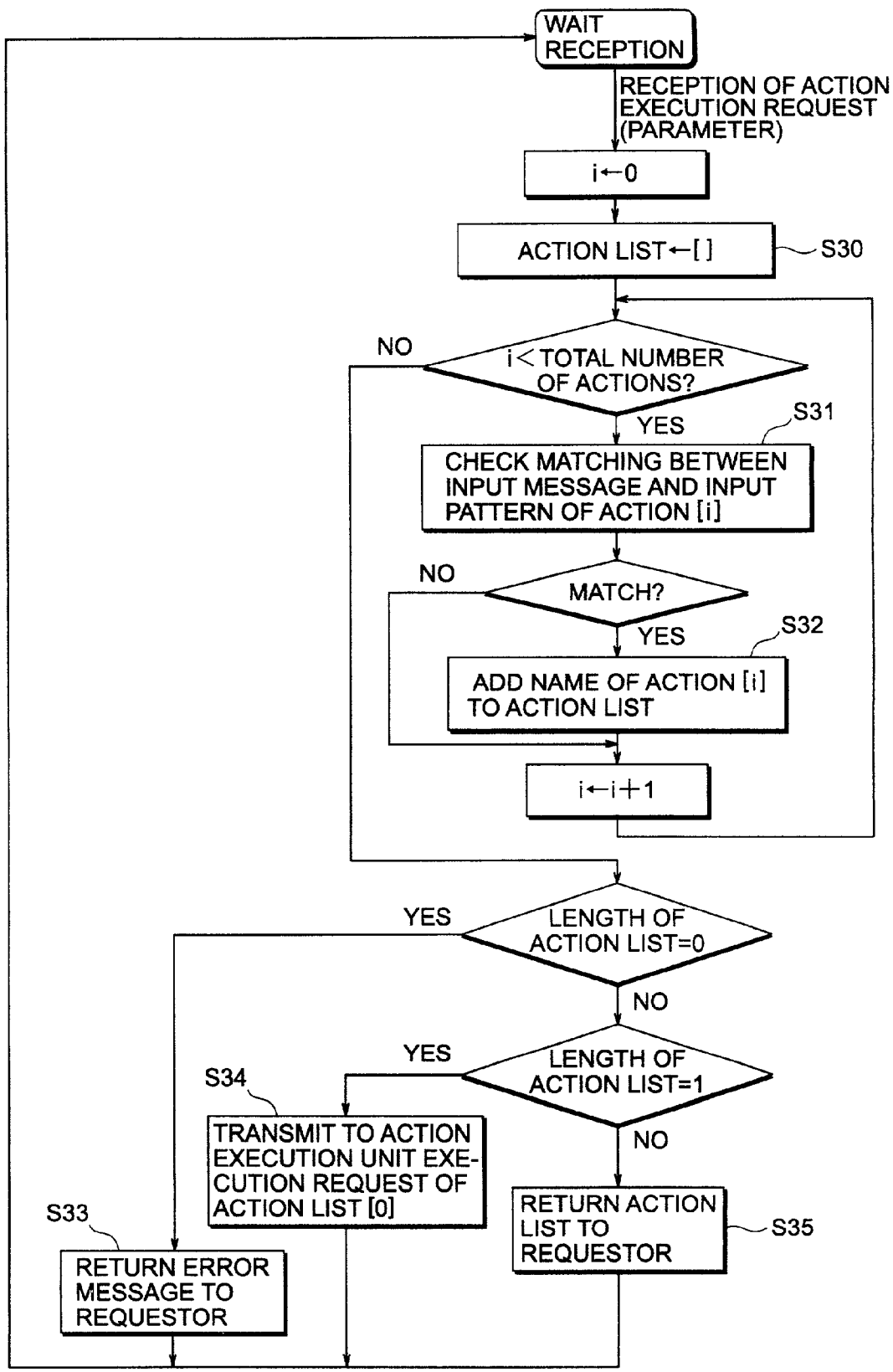
FIG. 6 is a flowchart showing processing performed in a pattern match processing unit.

FIG. 6 is a flowchart showing processing performed in the pattern match processing unit 13. Upon receipt of an action execution request (parameter), the pattern match processing unit 13 renders an action list empty (step S30). Subsequently, for each of the actions, the pattern match processing unit 13 checks whether the input pattern of the action matches the contents of the parameter of a received message (step S31), and adds the name of an applicable action into the action list (step S32). When no action is selected during checking of all the actions, the pattern match processing unit 13 sends an error message back to the requester agent (step S33). When only one action is selected, the pattern match processing unit 13 sends to the action execution unit 14 a request for executing the action (step S34). When a plurality of actions are selected, the pattern match processing unit 13 sends the action list back to the requestor agent (step S35).

Figure 7:
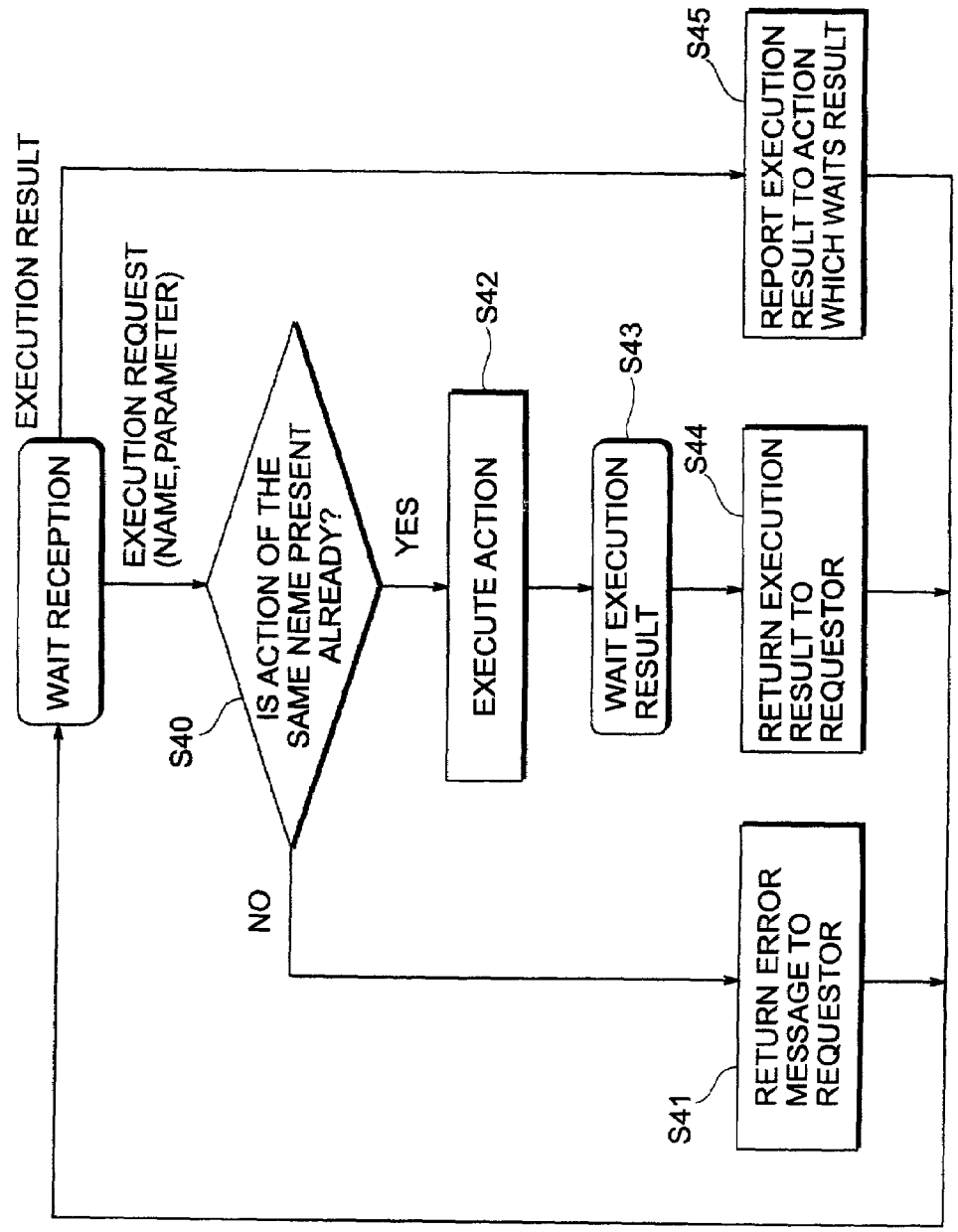
FIG. 7 is a flowchart showing processing performed in an action execution unit.

FIG. 7 is a flowchart showing processing performed in the action execution unit 14. Upon reception of an execution request, the action execution unit 14 checks whether an action whose name is the same as the name designated by the parameter of the execution request is present in the action/attribute storage unit 15 (step S40). If an action having the same name is not present, the action execution unit 14 sends an error message back to the requester agent (step S41). If an action having the same name is present, the action execution unit 14 executes the action (step S42), and awaits completion of the processing (step S43). After completion of the execution of the action, the action execution unit 14 sends an execution result to the requestor agent (step S44). When the action execution unit 14 receives a result of execution of an action, action execution unit 14 sends the execution result to a requester action which awaits the received execution result (step S45).

When the parameter of the message of an execution request is an event object, the flow control unit 20 is started as an action to be ignited, whereby dynamic flow control is effected.

Figure 8:
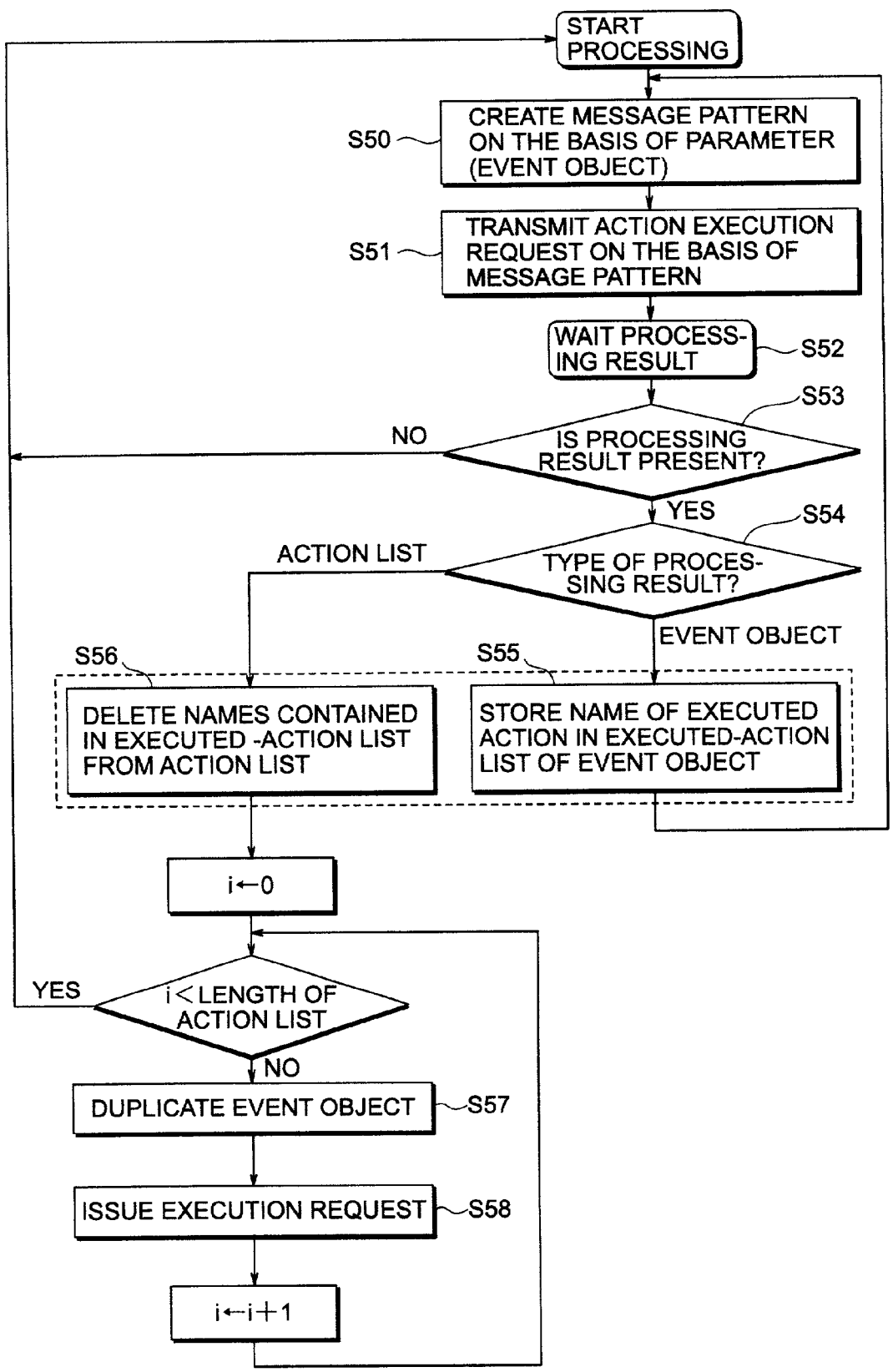
FIG. 8 is a flowchart showing processing performed in a flow control unit.

FIG. 8 is a flowchart showing processing performed in the flow control unit 20. When the flow control unit 20 is started by means of the action execution unit 14, the flow control unit 20 creates a message pattern on the basis of the event object which is a parameter of the execution request as a parameter (step S50) and transmits to the message transmission unit 16 an action execution request in which the own address is set as a transmission-destination address (step S51). Subsequently, the flow control unit 20 awaits a processing result (step 52). The processing result is sent back to the flow control unit 20 by the action execution unit 14, so that processing for the flow control function is continued.

When a processing result is received (step S53), the flow control unit 20 checks the type of the processing result (step S54). If the processing result is an event object, the flow control unit 20 repeats the processing in steps S50 to 54. That is, the flow control unit 20 creates a message pattern on the basis of the event object, and issues an action execution request. In order avoid ignition of an unnecessary action, the processing may be modified such that a memory for storing a list of executed actions is provided in the event object; and the name of the action which has just been executed is added to the list of executed actions (step S55).

If the processing result which has been sent back is a list of action names, the flow control unit 20 duplicates the event object in order to execute the listed actions in parallel (step S57). Subsequently, the flow control unit 20 recursively issues an execution request which includes each action name as a parameter (step S58).

In order avoid ignition of an unnecessary action, the processing may be modified such that a memory for storing a list of executed actions is provided in the event object; and when one or more action names listed in the list are contained in a selected action list, these action names are deleted from the action list in order prevent execution of an action or actions which have already been executed (step S56). When the execution result which has been sent back contains no data, the flow control unit 20 stops in order to stop the chained execution of the actions.

Figure 9:
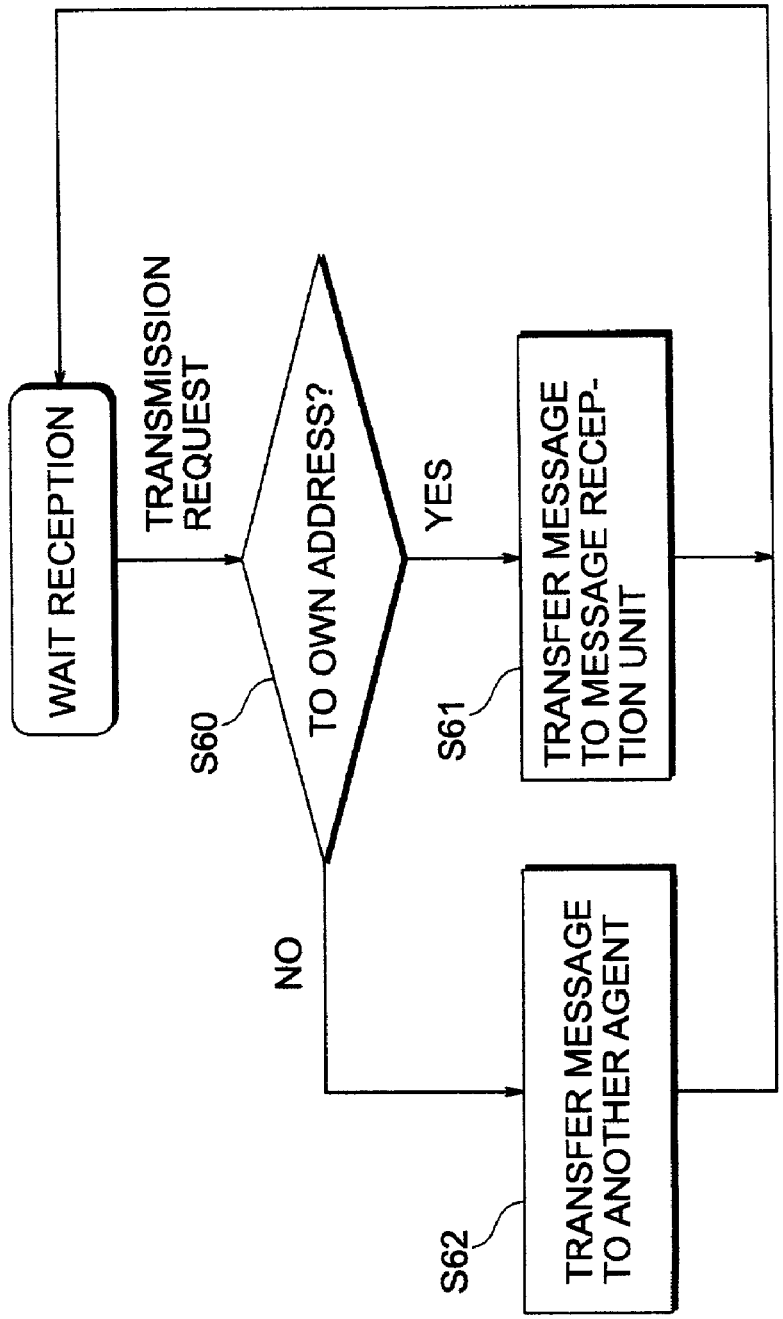
FIG. 9 is a flowchart showing processing performed in a message transmission unit.

FIG. 9 is a flowchart showing processing performed in the message transmission unit 16. Upon receipt of a message (transmission request), the message transmission unit 16 checks the transmission-destination address of the received message and judges whether the transmission destination is the agent in which the message transmission unit 16 is present (step S60). When the transmission-destination address is the address of the agent 1 itself, the message transmission unit 16 transfers the received message to the message reception unit 11 of the agent (step S61). When the transmission-destination address is not the address of the agent 1 itself, the message transmission unit 16 transfers the received message to another agent in accordance with the transmission-destination address of the message (step S62).

Next, a concrete example which is realized by use of the Java language will be described. However, the present invention is not limited to cases in which the Java language is used, and can be applied to cases in which any other programming language is used.

[1] Embodiment of the Flow Control Unit 20 (Flow Controller)

The flow control unit 20 can be implemented as one action (FlowController) among the actions which define the behavior of the agent. Further, the message pattern, which serves as a condition for ignition of the flow control unit 20 (hereinafter referred to as "FlowController"), is defined as follows when a single parameter is present and its type is an event object.

```
public class FlowController extends Action {
    public void start (EventObject event) {
        // flow control processing (see FIG. 8)
    }
}
```

When the agent receives an object of the EventObject class, the start() method of the above-described FlowController is executed. For example, in the start() method of the present example, the argument EventObject is expanded into the message pattern as shown below and is transmitted to the FlowController itself.

{<event object>, <event source>, <event attribute>, <name of an action just executed>, <result of execution of the action just executed>}

Here, the <event source> represents the address of an agent which first generated a received event object; and <event attribute> represents an attribute value of the event object which is permitted to change in the course of a chain of actions.

EXAMPLE 1

Example of action chain

It is assumed that the following two actions are added to the agent.

```
public class ActionOne extends Action {
    public Event_B start (Event_A event) {
        :
        return new Event_B ( . . . );
    }
}
public class ActionTwO extends Action {
    public Event_C start (Event_B event) {
        :
        return new Event_C ( . . . );
    }
}
```

Here, Event_A, Event_B, and Event_C are all assumed to be subclasses of EventObject. That is, the following is assumed.

public class Event_A extends EventObject { . . . }
public class Event_B extends EventObject { . . . }
public class Event_C extends EventObject { . . . }

At this time, the action management unit 12 sets the input patterns of added actions as follows such that the input patterns match FlowController.

Input pattern of ActionOne:
  {Event_A.class, AgentAddress.class, Object.class, String.class, Object.class}
Input pattern of ActionTwo:
  {Event_B.class, AgentAddress.class, Object.class, String.class, Object.class}

Here, Event_A.class represents any arbitrary object of the class Event_A. Similarly, String.class represents any arbitrary character string. It is to be noted that the input pattern of FlowController is represented as follows.

{EventObject.class}

Figure 10A:
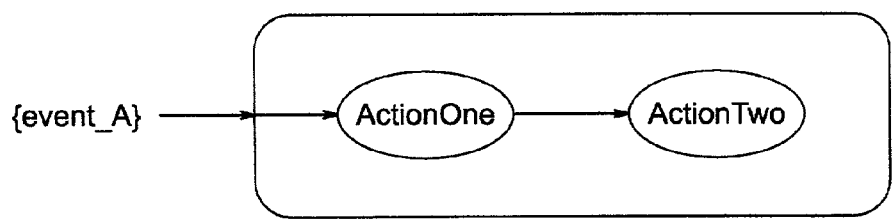
FIGS. 10A and 10B are diagrams showing an example of an action chain.
Figure 10B:
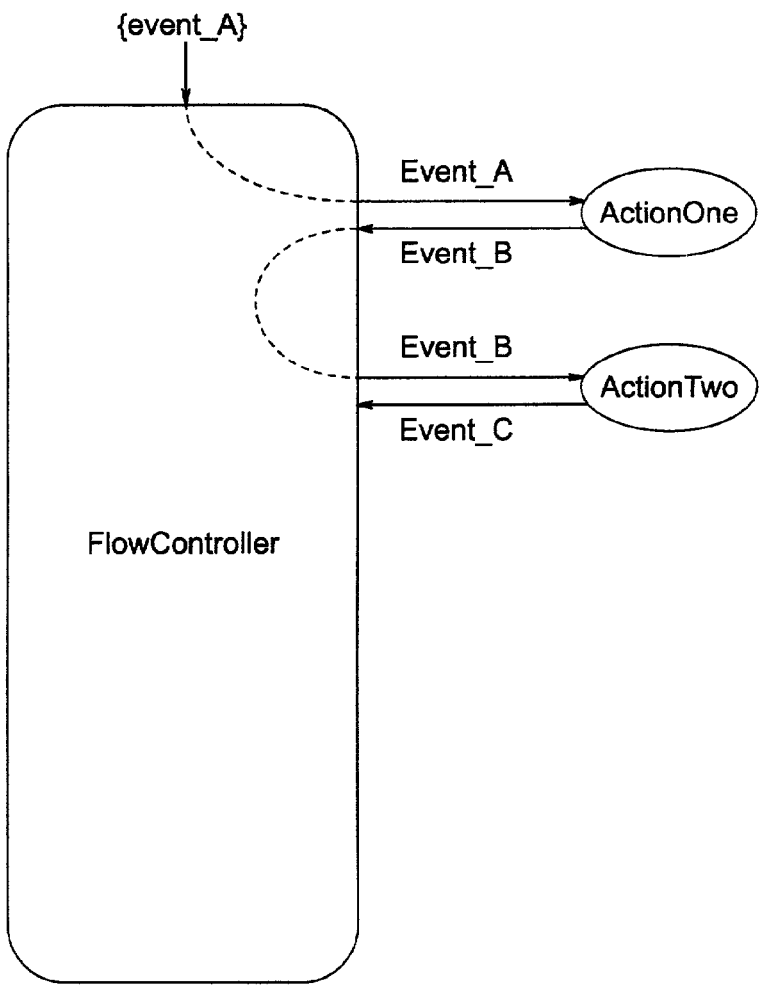

Here, it is assumed that Event_A is transmitted to the agent under consideration. As will be described below, ultimately a chain of actions as shown in FIG. 10A is produced. FIG. 10B shows the relationship among FlowController, ActionOne, and ActionTwo during execution of the chained actions.

It is assumed that a message first received has the following form:

{event_A}, and event_A is an instance of the class Event_A. At this time, through pattern matching, the pattern match processing unit 13 selects only FlowController from the above mentioned three different input patterns. Thus, FlowController is executed. FlowController generates the following message pattern from the received event_A and transmits an action execution request.

{event_A, event_A.source(), event_A.attribute(), null, null}

Here, through pattern matching, the pattern match processing unit 13 selects only ActionOne from the above mentioned three different input patterns. Thus, ActionOne is executed. ActionOne returns Event_B as a return value, while Event_A is used as an argument. Therefore, FlowController generates the following message pattern and transmits an action execution request.

{event_B, event_B.source(), event_B.attribute(), "ActionOne", null}

Here, through pattern matching, the pattern match processing unit 13 selects only ActionTwo from the above mentioned three different input patterns. Thus, ActionTwo is executed. ActionTwo returns Event_C as a return value, while Event_B is used as an argument. Therefore, FlowController generates the following message pattern and transmits an action execution request.

{event_C, event_C.source( ), event_C.attribute( ), "ActionTwo", null}

Here, the processing unit 13 finds that none of a matched pattern in the above mentioned three input patterns. Therefore, the processing unit 13 sends an error message back to FlowController. Accordingly, the chaining of actions is stopped.

As described above, a flow ActionOne→ActionTwo upon generation of Event_A can be defined through mere addition of the action to the agent. This is one of the important features of the present invention.

Further, even when it is desired to add a new flow without affecting the existing flow, in many cases, such addition of the new flow can be realized through mere addition of action. For example, here is considered a state in which the following ActionThree whose input is Event_A is added to the agent.

```
public class ActionThree extends Action {
    public Event_B start (Event_A event) {
        :
        return new Event_B ( ... );
    }
}
```

In this case, upon generation of Event_A, the pattern matching processing unit 13 first selects ActionOne and ActionThree. Therefore, a flow of ActionOne→ActionTwo and a flow of ActionThree are executed concurrently.

Figure 11A:
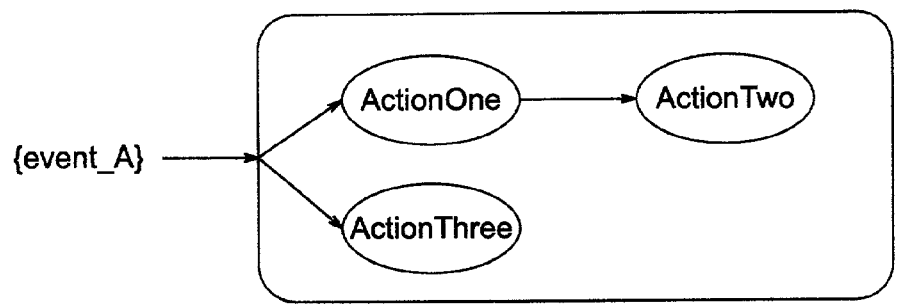
FIGS. 11A and 11B are diagrams showing another example of an action chain.
Figure 11B:
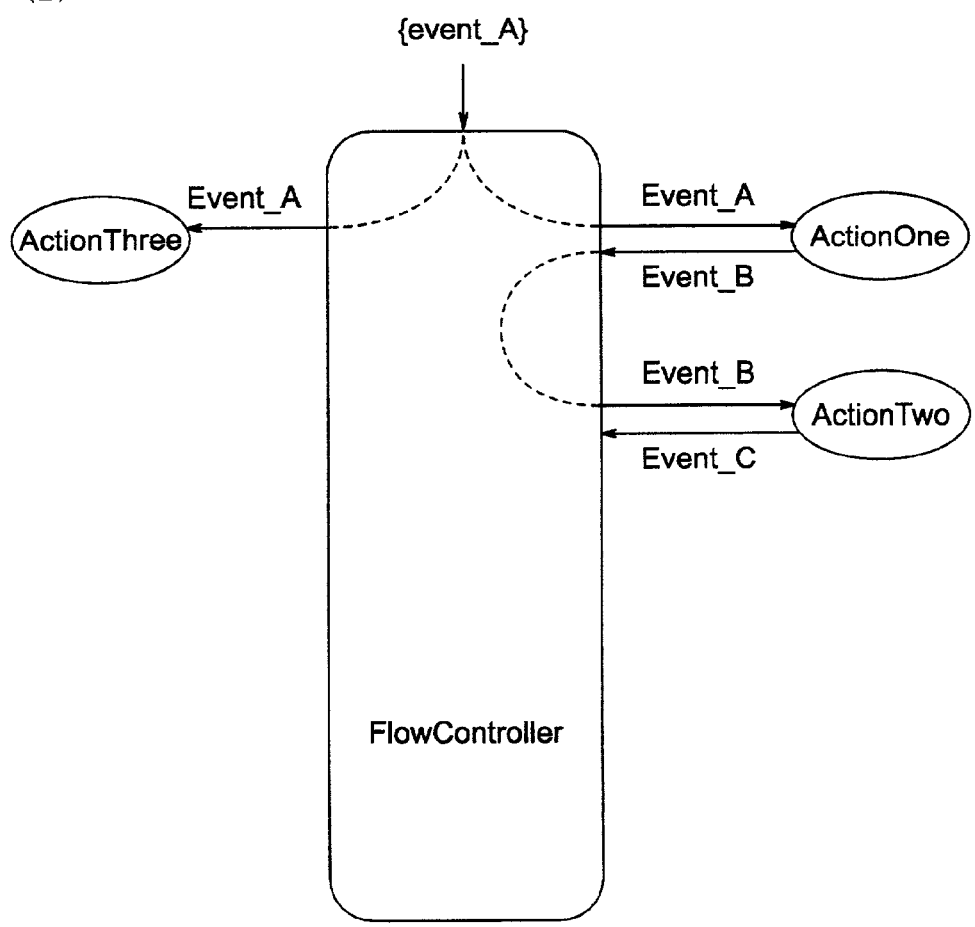

FIG. 11A shows a resultant chain of actions. FIG. 11B shows the relationship among FlowController, ActionOne, ActionTwo, and ActionThree during execution of the chained actions.

EXAMPLE 2

Restriction of flow By Use of Action Names

In Example 1 described above, since each of the actions which constitute a flow is defined to expect input of an event of a different type, no problem arises. However, if ActionTwo is defined to expect input of Event_A as in the case of ActionOne, all the actions are ignited simultaneously, and an expected flow cannot be obtained. In this case, when each action is added, its input pattern is customized to clearly designate the name of another action which is executed immediately before the action, to thereby restrict the flow. For example, it is assumed that each of the three actions handles Event_A as input and output.

```
public class ActionOne extends Action {
    public Event_A start (Event_A event) { ... )
}
public class ActionTwo extends Action {
    public Event_A start (Event_A event) { ... )
}
public class ActionThree extends Action {
    public Event_A start (Event_A event) { ... )
}
```

In this case, when each action is added, the fourth item of the input pattern is changed to designate a specific action name.

Input pattern of ActionOne:
{Event_A.class, AgentAddress.class, Object.class, String.class, Object.class}

Input pattern of ActionTwo:
{Event_A.class, AgentAddress.class, Object.class, "ActionOne", Object.class}

Input pattern of ActionThree:
{Event_A.class, AgentAddress.class, Object.class, "ActionTwo", Object.class}

It is assumed that Event_A is generated for the agent in this state. Since each first item of the input patterns is Event_A.class, all actions can become a candidate. However, the fourth item of the massage transmitted from FlowController is null, and ultimately only ActionOne is selected. After completion of ActionOne, the fourth item of the message transmitted from FlowController indicates "ActionOne," which is the name of an action just executed, and only ActionTwo is selected.

Figure 12A:
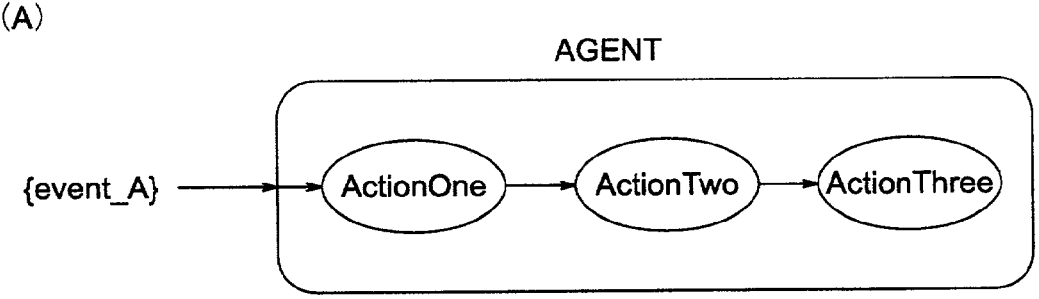
FIGS. 12A and 12B are diagrams showing still another example of an action chain.
Figure 12B:
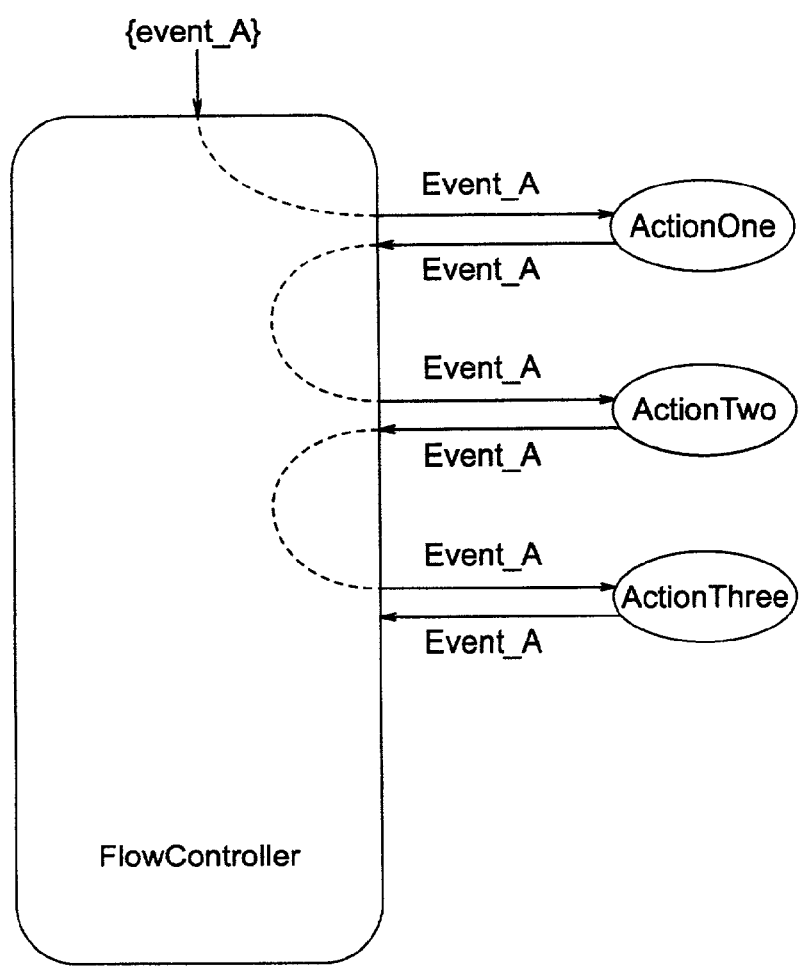

Therefore, the flow which is actually determined for Event_A becomes ActionOne→ActionTwo→ActionThree. FIG. 12A shows a resultant chain of actions. FIG. 12B shows the relationship among FlowController, ActionOne, ActionTwo, and ActionThree during execution of the chained actions.

EXAMPLE 3

Expression of If-Then Rule by Use of Input Patterns

The advantage of pattern matching is that, not only a simple serial flow, but also a general flow containing a conditional branch can be expressed through customization of input patterns, without modification of any action. Here is assumed the case in which an action for returning a Boolean-type object is added to ActionOne and ActionTwo which are the same as those described in Example 2.

```
public class ConditionalAction extends Action {
    public Boolean start (Event_A event) {
        if ( ... )
            return Boolean.TRUE;
        else
            return Boolean.FALSE;
    }
}
```

The input patterns of the above-described actions are set as follows. The condition in the fifth item of the input pattern of ActionOne is changed to TRUE of Boolean class, and the condition in the fifth item of the input pattern of ActionTwo is changed to FALSE of Boolean class.

Input pattern of ActionOne:
{Event_A.class, AgentAddress.class, Object.class, String.class, Boolean.TRUE}

Input pattern of ActionTwo:
{Event_A.class, AgentAddress.class, Object.class, String.class, Boolean.FALSE}

Input pattern of ConditionalAction:
{Event_A.class, AgentAddress.class, Object.class, String.class, Object.class}

In this case, only ConditionalAction is first ignited upon generation of Event_A, because the fifth item of the input pattern of ConditionalAction includes no conditions. However, depending on whether ConditionalAction returns Boolean.TRUE or Boolean.FALSE as a return value, it is determined which one of ActionOne and ActionTwo is to be performed next. That is, a flow containing a conditional branch (such as an If-Then rule) can be realized through customization of input patterns.

Figure 13A:
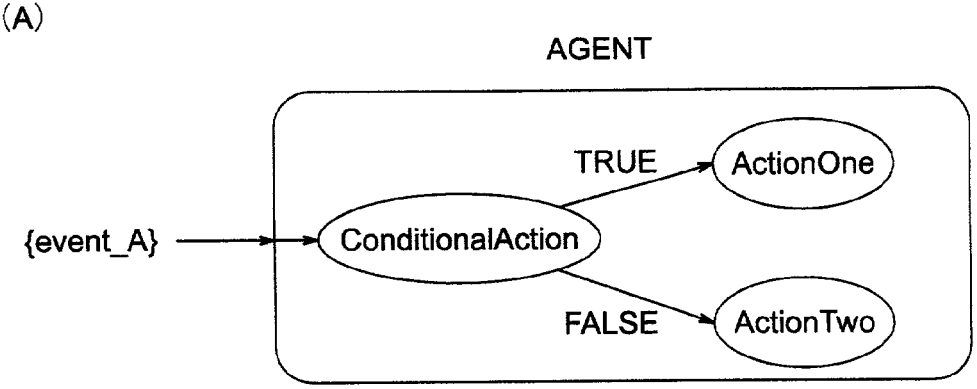
FIGS. 13A and 13B are diagrams showing still another example of an action chain.
Figure 13B:
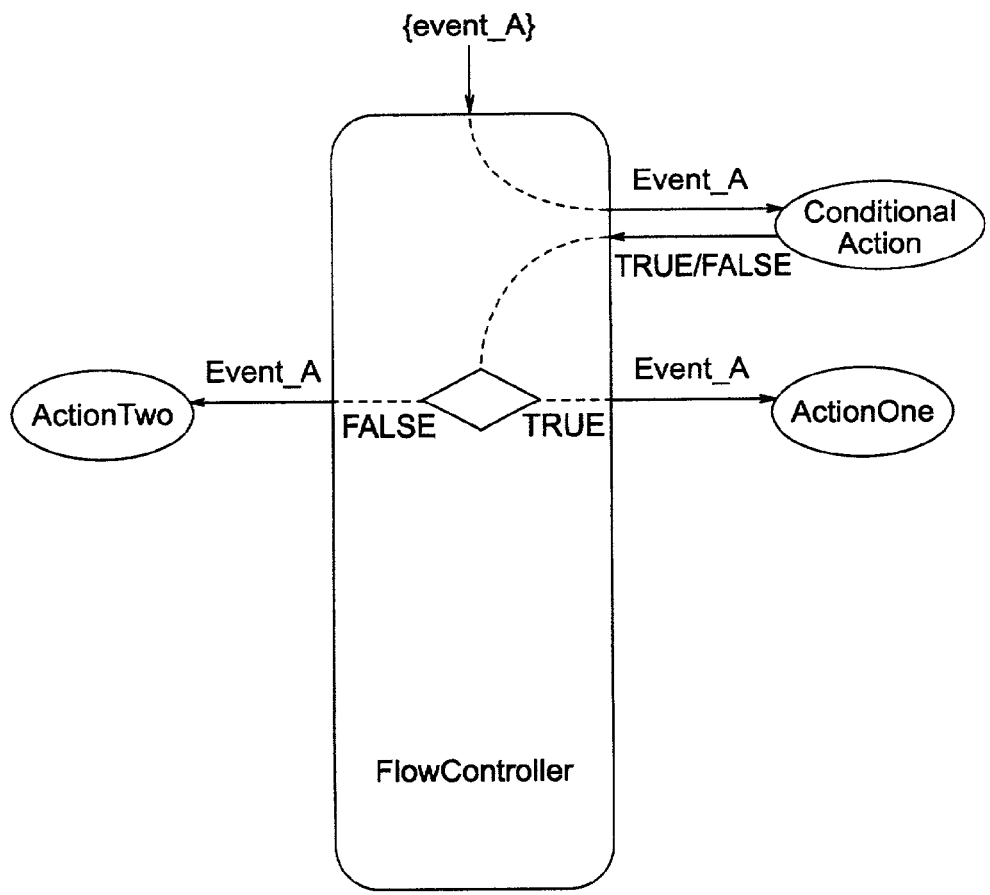

FIG. 13A shows a resultant chain of actions in the present example. FIG. 13B shows the relationship among FlowController, ConditionalAction, ActionOne, and ActionTwo during execution of the chained actions.

[2] Example Application to Personal Agent

A concrete example of application of the present invention will be described with reference to dynamic notification of service event in a personal agent. Sometimes users wish to be notified of events of various network services (arrival of an e-mail, arrival of a phone call, update of a schedule) every time such an event occurs. Further, some users desire to frequently change between communication terminals such as a personal computer (PC) and a cellular phone. The role of the personal agent is to transmit events of various services to a user via a terminal which the user is currently using, such that the events are expressed in a manner suitable for the currently-used terminal.

Figure 14:
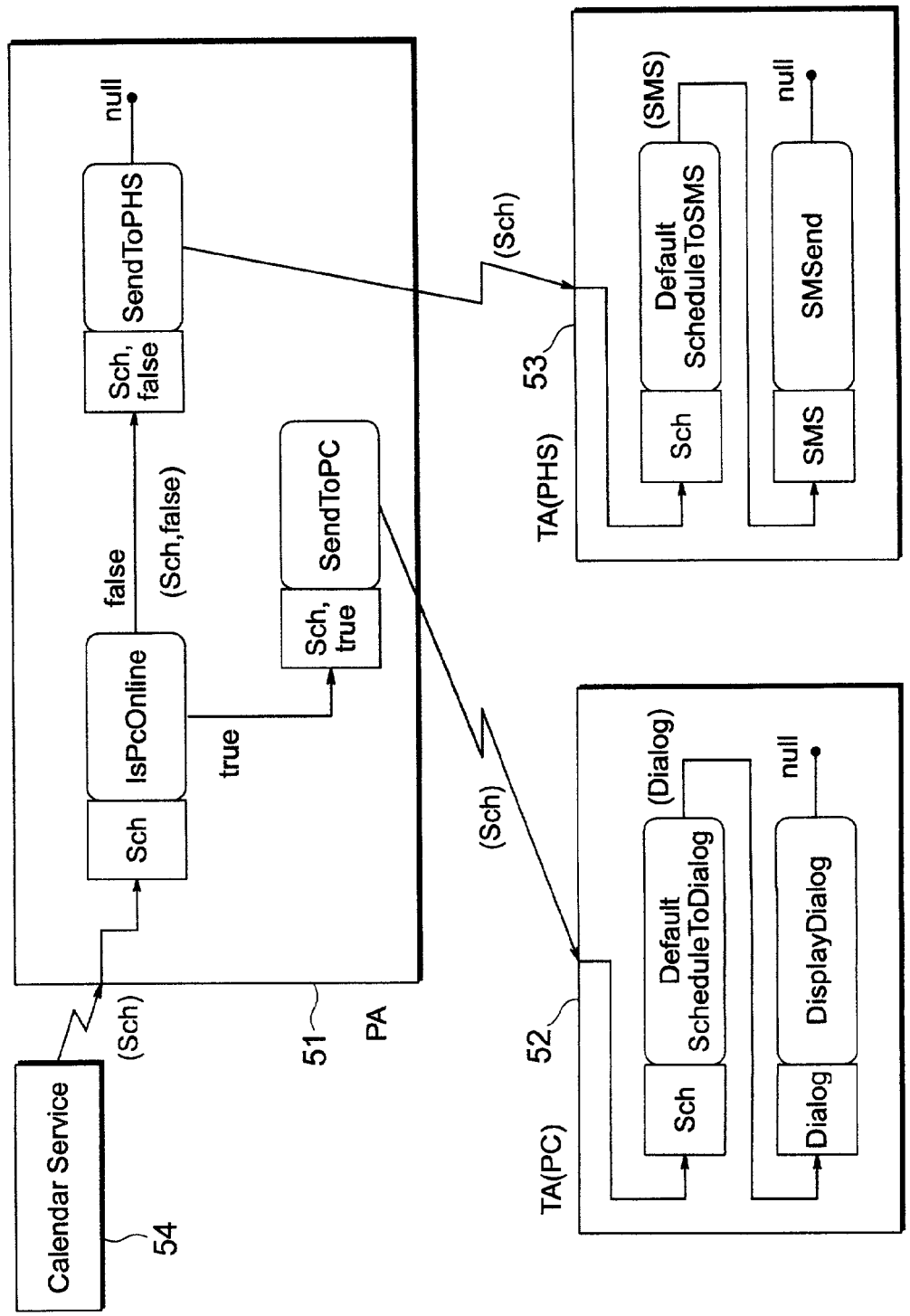
FIG. 14 is a diagram showing an example of an action structure for event report in a personal agent.
Figure 15:
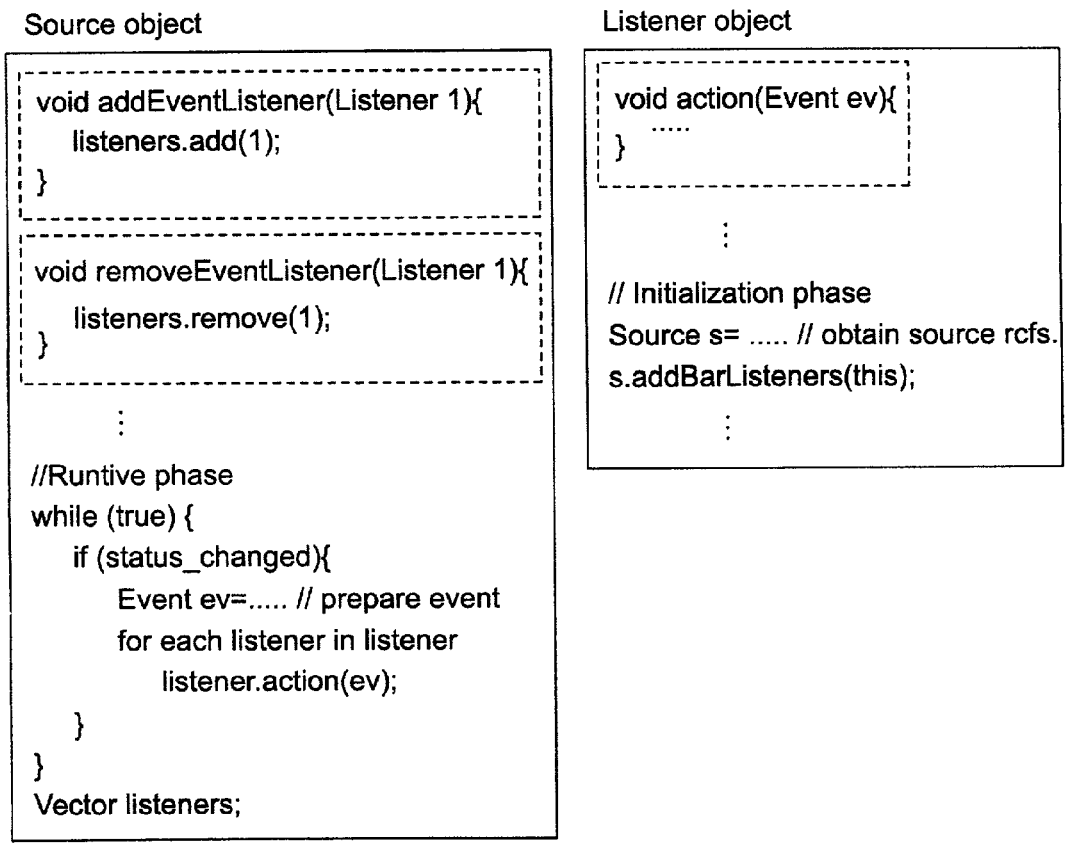
FIG. 15 is a diagram showing an example of a class definition used in a conventional event processing model.
Figure 16:
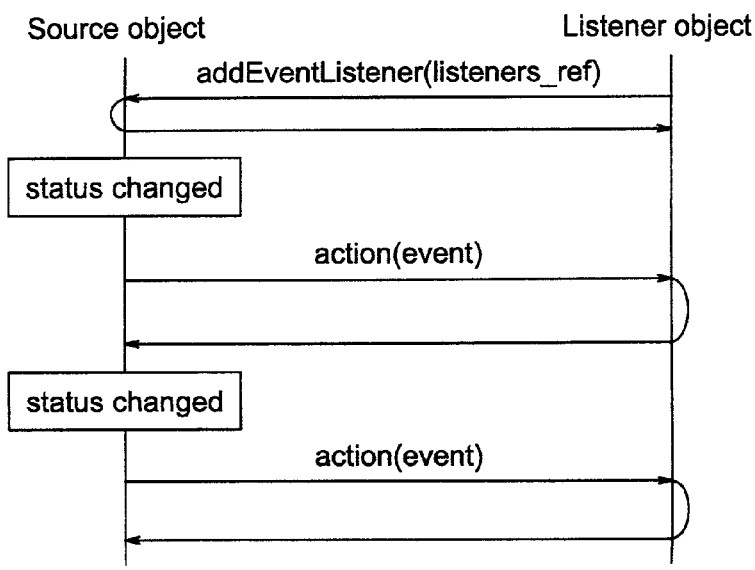
FIG. 16 is a diagram showing an example sequence of conventional event processing.

For example, it is assumed the case in which, when a user receives a schedule update event from a calendar service, such event is displayed on a screen of the user's PC if the PC is connected to a network, and such an event is notified in the form of a short message via the cellular phone if the PC is not connected to the network. FIG. 14 shows the action configuration in the personal agent (PA) for such event notification.

Three actions (IsPcOnline, SendToPHS, SendToPC) are added to the personal agent (PA) 51. The action IsPcOnline is a module which returns TRUE when the user's PC is connected to the network, and returns FALSE when the user's PC is not connected to the network. The actions SendToPHS and SendToPC are modules which respectively transfer events to TA(PC) 52 and TA (PHS) 53, which are software programs trapped in the agent and which provide low-level controls for the PC terminal and the PHS terminal, respectively. Further, the input patterns of the actions SendToPHS and SendToPC are set as follows.

Input pattern of SendToPC:
{EventObject.class, AgentAddress.class, Object.class, String.class, Boolean.TRUE}

Input pattern of SendToPHS:
{EventObject.class, AgentAddress.class, Object.class, String.class, Boolean.FALSE}

This example operates according to the same rule as that in Example 3 described above. If PA51 receives a schedule update event from the calendar service 54 and the user's PC is on line, the actions IsPcOnline and SendToPC are ignited, in this order, in PA51. Thus, the schedule event is transferred to the agent TA (PC) 52, which controls the PC. In the agent TA (PC) 52, an action DefaultScheduleToDialog for converting information contained in the event to dialog data operates, so that an action DisplayDialog for receiving dialog data and displaying them on the screen operates. Thus, the schedule update can be reported to the user who sits in front of the PC.

If the user's PC is off line, the action IsPcOnline returns FALSE. Therefore, the event is transferred via the action SendToPHS to the agent TA (PHS) 53, which controls the cellular phone. In the agent TA (PHS) 53, an action DefaultScheduleToSMS for converting information contained in the event to a short message operates, so that an action SMSend for sending the converted short message data to the cellular phone network operates. Thus, the schedule update can be reported to the user who is out while carrying the cellular phone.

Further, if the first parameter of the input pattern of each of the three actions in PA 51 is declared with EventObject.class, the same event notification rule is applied to all the events, so that the above-described configuration can be used as is for any type of service event, such as arrival of an e-mail or arrival of a phone call.

By contrast, when the above-described event notification rule is required to be applied only to a specific service, a series of actions which have input patterns restricted to the type of events transmitted from the specific service is added to PA 51. Thus, customization is effected without affecting the chain of actions already defined.

The units used in the above-described embodiment may be realized by other means, such a computer program.

The present invention achieves the following effects.

(1) In event processing in a distributed system, a action which is executed upon receipt of an event object is separated from a server object; and flow control means is provided in the server object in order to select an action to be ignited in accordance with the type of the received event object. Thus, it becomes possible to dynamically introduce new event processing without affecting other actions in the server object.

(2) The definition of an action which is executed upon reception of an event object is separated from the definition of an input pattern which serves as a condition under which the action is selected. Therefore, behavior for the event can be changed through modification of the definition of the input pattern without necessity of changing the definition or configuration of the action.

(3) When an action which has been executed upon receipt of an event returns an event object as an execution result, the flow control means checks the type of the newly received event object, and repeats selection and execution of an action to be ignited next. Thus, a dynamic flow can be determined.

(4) Since not only the type of an event object, but also the value of the event object or the attribute value of the event object, can be included in the definition of the input pattern, ignition of actions can be controlled.

(5) The name of an action which is expected to be executed immediately before is included in the definition of the input pattern, and the flow control means checks the definition before selection of an action. Thus, it becomes possible to control the order of actions to be executed.

(6) There is provided a function of storing a list of actions already executed, and a rule such that an action or actions which have been executed are excluded from actions to be ignited is provided, when the flow control means selects an action. Thus, the flow is prevented from forming an endless loop.

As described, in event processing which serves as a mechanism for linking objects in a distributed system, an event processing definition portion is defined as an action which is an independent component. Thus, it becomes possible to dynamically replace the behavior, or to add a new behavior without affecting the existing behavior. Further, addition of the flow control means enables realization of the event processing definition by use of a chain of a plurality of actions. Thus, it becomes possible to secure the independence of action components which constitute event processing and to enhance the re-usability of the action components.

The many features and advantages of the invention are apparent from the detailed specification and, thus, the appended claims are intended to cover all such features and advantages of the invention which fall within the true spirit and scope of the invention. Further, since numerous modifications and changes will readily occur to those skilled in the art, it is not intended that the invention be limited to the exact construction and operation illustrated and described, and accordingly all suitable modifications and equivalents may be resorted to, so long as they fall within the scope of the invention.

What is claimed is:

1. An apparatus for dynamically determining a flow by means of an action chain in event processing performed in a distributed system, the apparatus comprising:

an action/attribute storage unit storing information regarding actions to be executed upon receipt of a first event object; and a flow control unit selecting an action to be ignited from the actions stored in the action/attribute storage unit in accordance with a type of the received first event object and creating a message that is an action execution request in which the address of the flow control unit is designated as a transmission destination address, wherein when receiving a second event object as the result of execution of the selected action, the flow control unit selects another action to be ignited next and executed from the actions in the action/attribute storage in accordance with a type of the newly received second event object so as to dynamically realize a chain of actions.

2. A dynamic flow determination apparatus according to claim 1, wherein the action/attribute storage unit stores a definition of an action which is executed upon reception of an event object separately from a definition of an input pattern which serves as a condition under which the action is selected, whereby behavior for an event is changed through modification of the definition of the input pattern without necessity of changing the definition or configuration of the action.

3. A dynamic flow determination apparatus according to claim 2, wherein the value of the event object or the attribute values of the event object is included in the definition of the input pattern stored in the action/attribute storage unit, whereby ignition of each action is controlled on the basis of the definition of the input pattern.

4. A dynamic flow determination apparatus according to claim 2, wherein the name of an action which is expected to be executed immediately before another action is included in the definition of the input pattern stored in the action/attribute storage unit; and the flow control unit checks the definition of the input pattern before selection of actions to thereby control the order of actions to be executed.

5. A dynamic flow determination apparatus according to claim 1, wherein:

the flow control unit stores a list of actions already executed, when the flow control unit selects actions and the flow control unit excludes an action or actions which have been executed from actions to be ignited to thereby prevent the flow from forming an endless loop.

6. An apparatus for dynamically determining a flow by means of an action chain in event processing performed in a distributed system, the apparatus comprising:

an action/attribute storage unit for storing definition information regarding actions;

a message reception unit for receiving a message;

a message transmission unit for transmitting a message;

an action management unit for changing definition information regarding an action when the received message is a request for changing the definition information regarding the action;

a pattern match processing unit for comparing the contents of a parameter of a message which is received as an action execution request with information stored in the action/attribute storage unit in order to select matched actions;

an action execution unit for managing execution of the selected action; and a flow control unit, which is started by the action execution unit upon receipt of an event object, for selecting actions to be executed next in accordance with a type of the received event object and for creating a message that is an action execution request in which the address of the flow control unit is designated as a transmission destination address, whereby the flow control unit repeats selecting an action to be executed next in accordance with a type of the received event object.

7. A method for dynamically determining a flow by means of an action chain in event processing performed in a distributed system, the method comprising:

receiving a message that is an action execution request from an agent;

checking whether the action execution request has a name designating an action in an action/attribute storage unit which stores information regarding actions to be executed upon receipt of an event object; and executing the designated action when the action is present in the action/attribute storage unit, otherwise selecting an action to be ignited from the actions stored in the action/attribute storage unit in accordance with a type of a received first event object, creating a message that is an action execution request in which the address of the received message is designated as a transmission destination address, and, when receiving a second event object as the result of execution of the selected action, repeating the selection of an action to be ignited so as to dynamically realize a chain of actions.

8. A computer readable medium storing a program to operate an apparatus for dynamically determining a flow by means of an action chain in event processing performed in a distributed system, the program causing the apparatus to perform a method comprising:

receiving a message;

transmitting a message;

changing definition information regarding an action when the received message is a request for changing the definition information regarding the action;

comparing the contents of a parameter of a message which is received as an action execution request with a pattern for selection of an action in order to select matched actions;

managing execution of the selected action; and upon receipt of a first event object, selecting an action to be executed next in accordance with a type of the received first event object and creating a message that is an action execution request in which the address of the received message is designated as a transmission destination address, wherein the processing for selecting an action to be executed next in accordance with a type of the received event object is repeated when receiving a second event object so as to dynamically realize a chain of actions.

9. An apparatus for dynamically determining a flow by means of an action chain in event processing performed in a distributed system, the apparatus comprising:

action/attribute storage means for storing information regarding actions to be executed upon receipt of a first event object; and flow control means selecting an action to be ignited from the actions stored in the action/attribute storage means in accordance with a type of the received first event object and creating a message that is an action execution request in which the address of the flow control unit is designated as a transmission destination address, wherein when receiving a second event object as the result of execution of the selected action, the flow control means selects another action to be ignited next and executed from the actions in the action/attribute storage in accordance with a type of the newly received second event object so as to dynamically realize a chain of actions.

10. A dynamic flow determination apparatus according to claim 9, wherein the action/attribute storage means stores a definition of an action which is executed upon reception of an event object separately from a definition of an input pattern which serves as a condition under which the action is selected,
whereby behavior for an event is changed through modification of the definition of the input pattern without necessity of changing the definition or configuration of the action.

11. A dynamic flow determination apparatus according to claim 10, wherein the value of the event object or the attribute values of the event object is included in the definition of the input pattern stored in the action/attribute storage means, whereby ignition of each action is controlled on the basis of the definition of the input pattern.

12. A dynamic flow determination apparatus according to claim 10, wherein the name of an action which is expected to be executed immediately before another action is included in the definition of the input pattern stored in the action/attribute storage means; and
the flow control means checks the definition before selection of actions to thereby control the order of actions to be executed.

13. A dynamic flow determination apparatus according to claim 9, wherein:
the flow control means stores a list of actions already executed, when the flow control means selects actions and
the flow control means excludes an action or actions which have been executed from actions to be ignited to thereby prevent the flow from forming an endless loop.

14. An apparatus for dynamically determining a flow by means of an action chain in event processing performed in a distributed system, the apparatus comprising:
action/attribute storage means for storing definition information regarding actions;
message reception means for receiving a message;
message transmission means for transmitting a message;
action management means for changing definition information regarding an action when the received message is a request for changing the definition information regarding the action;
pattern match processing means for comparing the contents of a parameter of a message which is received as an action execution request with the definition information stored in the action/attribute storage means in order to select matched actions;
action execution means for managing execution of the selected action; and
flow control means, which is started by the action execution means upon receipt of an event object, for selecting actions to be executed next in accordance with a type of the received event object and for creating a message that is an action execution request in which the address of the flow control unit is designated as a transmission destination address,
whereby the flow control means repeats selecting an action to be executed next in accordance with a type of the received event object.

15. A distributed system, comprising:
a dynamic flow determination apparatus which processes events cooperatively with one or more other apparatuses, wherein:
each apparatus keeps actions and attributes defined separately from the other apparatuses;
a dynamic flow of actions is determined through selection of actions corresponding to an input event; and
when receiving a second event object as the result of execution of an action selected in accordance with a type of a first event object, a flow control unit selects another action to be next activated and executed from actions in an action/attribute storage in accordance with a type of the second event object and creates a message that is an action execution request in which the address of the flow control unit is designated as a transmission destination address.

16. The distributed system according to claim 15, wherein different input patterns are defined for an event, and each of the different input patterns corresponds to each of the different action of the event, thus the dynamic flow of actions for an event is determined.

17. The distributed system according to claim 15, wherein when an executed result of an action is returned, another action is determined through the input pattern of an event following the result of the action.

18. The distributed system according to claim 15, wherein an attribute value of the action is defined for an event, so that the chain in dynamic flow of the action is controlled through the definition.

19. The distributed system according to claim 15 wherein a name of an action which is expected to be executed before the action is listed, so that the dynamic flow of action is determined through referencing the action name in time of selection of the action.

20. A method of operating an action execution unit implemented in a data processing system, comprising:
in response to receiving a first execution request, starting a flow control unit that selects a first action based on the first execution request and creates a message that is an action execution request in which the address of the flow control unit is designated as a transmission destination address; and
in response to receiving a second execution request, resulting from an execution of the first action, causing the flow control unit to select a second action based on the second execution request.

21. A method of operating a computer code execution module in a data processing system, comprising:
in response to receiving a first request to perform a function, creating a code selection unit that determines and provides first code based on the first function and that creates a message that includes a request to perform a function in which the address of the code selection unit is designated as a transmission destination address;
executing the first code provided by the code selection unit thereby generating a second request to perform a function; and
in response to receiving the second request to perform a function, causing the code selection unit to determine and provide second code based on the second function.

* * * * *

UNITED STATES PATENT AND TRADEMARK OFFICE
CERTIFICATE OF CORRECTION

PATENT NO. : 7,092,984 B2
APPLICATION NO. : 09/750785
DATED : August 15, 2006
INVENTOR(S) : Takashi Nishigaya et al.

It is certified that error appears in the above-identified patent and that said Letters Patent is hereby corrected as shown below:

Column 18, Line 32, after "claim 15" insert --,--.

Signed and Sealed this

Third Day of April, 2007

JON W. DUDAS
*Director of the United States Patent and Trademark Office*